US012004675B2

(12) United States Patent
Filko

(10) Patent No.: US 12,004,675 B2
(45) **Date of Patent: *Jun. 11, 2024**

(54) MOUNTING BRACKET LOCK

(71) Applicant: Lutron Technology Company LLC, Coopersburg, PA (US)

(72) Inventor: Brian Filko, Allentown, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/303,950

(22) Filed: Apr. 20, 2023

(65) Prior Publication Data

US 2023/0248171 A1 Aug. 10, 2023

Related U.S. Application Data

(63) Continuation of application No. 17/548,813, filed on Dec. 13, 2021, now Pat. No. 11,659,949, which is a (Continued)

(51) Int. Cl.
*A47H 1/122* (2006.01)
*E04F 10/06* (2006.01)
(Continued)

(52) U.S. Cl.
CPC ......... *A47H 1/122* (2013.01); *E04F 10/0685* (2013.01); *E06B 9/17015* (2013.01); *E06B 9/174* (2013.01); *E06B 9/24* (2013.01); *E06B 9/266* (2013.01); *E06B 9/42* (2013.01); *E06B 9/50* (2013.01)

(58) Field of Classification Search
CPC ........ E06B 9/17015; E06B 9/174; E06B 9/24; E04F 10/0685; A47H 1/122
USPC ..... 248/251; 160/266, 278, 309, 323.1, 324, 160/311, 319, 405
See application file for complete search history.

(56) References Cited

U.S. PATENT DOCUMENTS 6,475,101 B2 11/2002 Burrows
6,983,783 B2 1/2006 Carmen, Jr. et al.
(Continued)

FOREIGN PATENT DOCUMENTS

DE 102006062486 A1 7/2007
EP 2474702 A1 7/2012
WO 2003080979 A2 10/2003

*Primary Examiner* — Todd M Epps
(74) *Attorney, Agent, or Firm* — Duane Morris LLP

(57) ABSTRACT

A mounting bracket lock may be configured to secure the mounting bracket of a window treatment housing to a rail of the housing. The mounting bracket lock may be slidably attachable to the rail and, when in a locked position, may prevent the mounting bracket from detaching from the rail. The mounting bracket lock may include a body that is mountable to the rail. The body may include a first portion that slidably attaches to the rail, and a second portion that receives a portion of the rail and a portion of the mounting bracket, thereby securing the mounting bracket in a locked position relative to the rail. The body of the mounting bracket lock may define one or more projections that extend therefrom, and that engage in a friction fit between corresponding surfaces of the mounting bracket when the mounting bracket lock is in the locked position.

20 Claims, 15 Drawing Sheets

Related U.S. Application Data continuation of application No. 16/933,269, filed on Jul. 20, 2020, now Pat. No. 11,224,304, which is a continuation of application No. 16/458,213, filed on Jul. 1, 2019, now Pat. No. 10,716,423, which is a continuation of application No. 15/268,124, filed on Sep. 16, 2016, now Pat. No. 10,334,977.

(60) Provisional application No. 62/220,069, filed on Sep. 17, 2015.

(51) Int. Cl.

| | |
|---|---|
| ***E06B 9/17*** | (2006.01) |
| ***E06B 9/174*** | (2006.01) |
| ***E06B 9/24*** | (2006.01) |
| ***E06B 9/266*** | (2006.01) |
| ***E06B 9/42*** | (2006.01) |
| ***E06B 9/50*** | (2006.01) |

(56) References Cited

U.S. PATENT DOCUMENTS

| | | | | |
|---|---|---|---|---|
| 7,839,109 | B2 | 11/2010 | Carmen, Jr. et al. | |
| 8,950,461 | B2 | 2/2015 | Adams et al. | |
| 9,045,939 | B2 | 6/2015 | Blair et al. | |
| 10,334,977 | B2 * | 7/2019 | Filko | E04F 10/0685 |
| 10,716,423 | B2 * | 7/2020 | Filko | E04F 10/0685 |
| 11,224,304 | B2 * | 1/2022 | Filko | E06B 9/17015 |
| 11,659,949 | B2 * | 5/2023 | Filko | E06B 9/17015 248/251 |
| 2013/0098561 | A1 | 4/2013 | Mullet et al. | |
| 2013/0098591 | A1 | 4/2013 | Taras et al. | |
| 2014/0305602 | A1 | 10/2014 | Kirby et al. | |

* cited by examiner

MOUNTING BRACKET LOCK

CROSS-REFERENCE TO RELATED APPLICATIONS

This application is a continuation of U.S. patent application Ser. No. 17/548,813, filed Dec. 13, 2021 as a continuation of U.S. patent application Ser. No. 16/933,269, filed Jul. 20, 2020, now U.S. Pat. No. 11,224,304, issued on Jan. 18, 2022, which is a continuation of U.S. patent application Ser. No. 16/458,213, filed Jul. 1, 2019, now U.S. Pat. No. 10,716,423, issued on Jul. 21, 2020, which is a continuation of U.S. patent application Ser. No. 15/268,124, filed Sep. 16, 2016, now U.S. Pat. No. 10,334,977, issued on Jul. 1, 2019, which claims priority to U.S. provisional patent application No. 62/220,069, filed Sep. 17, 2015, each of which is incorporated herein by reference in its entirety.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible covering material, such as a shade fabric, that is wound onto an elongated roller tube. Such a roller shade may include a weighted hembar located at a lower end of the shade fabric. The hembar may cause the shade fabric to hang in front of one or more windows that the roller shade is mounted in front of.

Typically, a window treatment includes a housing that is configured to be attached to structure, such as a window frame. The housing may be configured to support one or more components of the window treatment in a mounted position. For example, the housing of a typical roller shade may be configured to operably support the roller tube, such that the covering material may be raised and lowered.

Such a housing may include a rail that is elongate between opposed ends, and a pair of housing brackets that are configured to attach to the ends of the rail. The housing brackets may be configured to support respective ends of the roller tube. In a typical configuration of such a housing, the rail may be configured to be attached to structure surrounding an opening, for example using fasteners such as screws. The housing brackets may be configured to be snapped into place at corresponding ends of the rail. The roller tube may then be attached to the housing brackets.

However, such snap-in mounting brackets may be prone to becoming detached from the rail, for example if the roller tube is bumped or otherwise dislodged from its snapped-in position relative to the rail. A known solution to such a problem is to secure the housing brackets in place relative to the rail, for example using screws.

However, such a solution may have undesirable consequences. For example, installing screws in a window treatment housing may be difficult or awkward with common tools (e.g., due to obstructing parts, cramped space, awkward tool angles, etc.). Additionally, once such a window treatment is installed and in a fully assembled configuration, components of the window treatment, such as the roller tube, may conceal the screws and/or obstruct access to them, which may make subsequent maintenance or removal undesirably difficult (e.g., to a user that did not install the window treatment or who is unfamiliar with how the housing brackets are secured to the rail).

SUMMARY

As described herein, a window treatment may include a mounting bracket lock. The mounting bracket lock may be configured to secure a mounting bracket of the window treatment housing to a rail of the housing. The mounting bracket lock may be configured to be attached to the rail such that it is moveable along the rail (e.g., slidable along the rail) between a locked position in which the mounting bracket lock prevents the mounting bracket from detaching from the rail, and an unlocked position in which the mounting bracket may be detached from the rail.

The mounting bracket lock may be configured to be easily operated into the locked position, for instance during installation of the window treatment. For example, the mounting bracket lock may be configured for toolless operation. To illustrate, the mounting bracket lock may be operated into the locked position without the use of tools, such as a screwdriver or screws. In addition, the mounting bracket lock may be configured such that, if during assembly of a window treatment, the mounting bracket is not properly attached to the rail, the mounting bracket lock may not be operated fully into the locked position. This may bring attention to an installer, such that the installer may then ensure proper attachment of the mounting bracket to the rail. Further, the operation of the mounting bracket lock may be easily understood so that a user may be able to quickly recognize how to operate the mounting bracket lock, for example after a period of time has passed since installation of the window treatment or if the user did not install the window treatment.

The example mounting bracket lock may include a body that is configured to be mountable to the rail of the window treatment housing. The body may include a first portion that is configured to slidably attach to the rail, and a second portion that is configured to receive a portion of the rail and a portion of a corresponding mounting bracket of the window treatment housing, thereby securing the mounting bracket in a locked position relative to the rail.

The first portion of the body of the mounting bracket lock may define a cavity that is mountable over a first section of the rail. The first portion of the body may further define an abutment surface that is configured to slide along a second section of the rail. The first section of the rail may be a ridge that extends along the rail, and the second section of the rail may be a ledge that extends along the rail. In accordance with an example configuration of the mounting bracket lock, the first portion of the body may define resilient retention strap. The retention strap may have a beveled end that defines the abutment surface. The beveled end may be configured to slidably engage with the second section of the rail to retain the mounting bracket lock in a slidable configuration relative to the rail. In accordance with another example configuration of the mounting bracket lock, the first portion of the body may define a rear wall. The rear wall may include a retention tab that defines the abutment surface. The first portion of the body may further define a resilient retaining strap that may be configured to slidably engage with the first section of the rail to retain the mounting bracket lock in a slidable configuration relative to the rail.

The second portion of the body of the mounting bracket lock may define an opening that extends into the body toward the first portion. The opening may be open to the cavity of the first portion of the body, and may be configured to receive both a portion of the mounting bracket and a corresponding portion of the first section of the rail.

The body of the mounting bracket lock may define one or more projections that extend therefrom, and that may be configured to engage with the mounting bracket when the mounting bracket lock is in the locked position. For example, the second portion of the body may define a first projection that extends therefrom and that is configured to engage with a first surface of the mounting bracket, and may define a second projection that extends therefrom and that is configured to engage with a second surface of the mounting bracket.

The first and second projections may extend from the second portion in respective first and second directions that are different from each other. The first and second projections may be configured to be received between the first and second surfaces of the attachment member so at to generate a friction fit therebetween. For example, the first and second projections may together define a wedge shape that may generate a friction fit within a cavity defined by the attachment member of the housing bracket.

DETAILED DESCRIPTION

Figure 1:
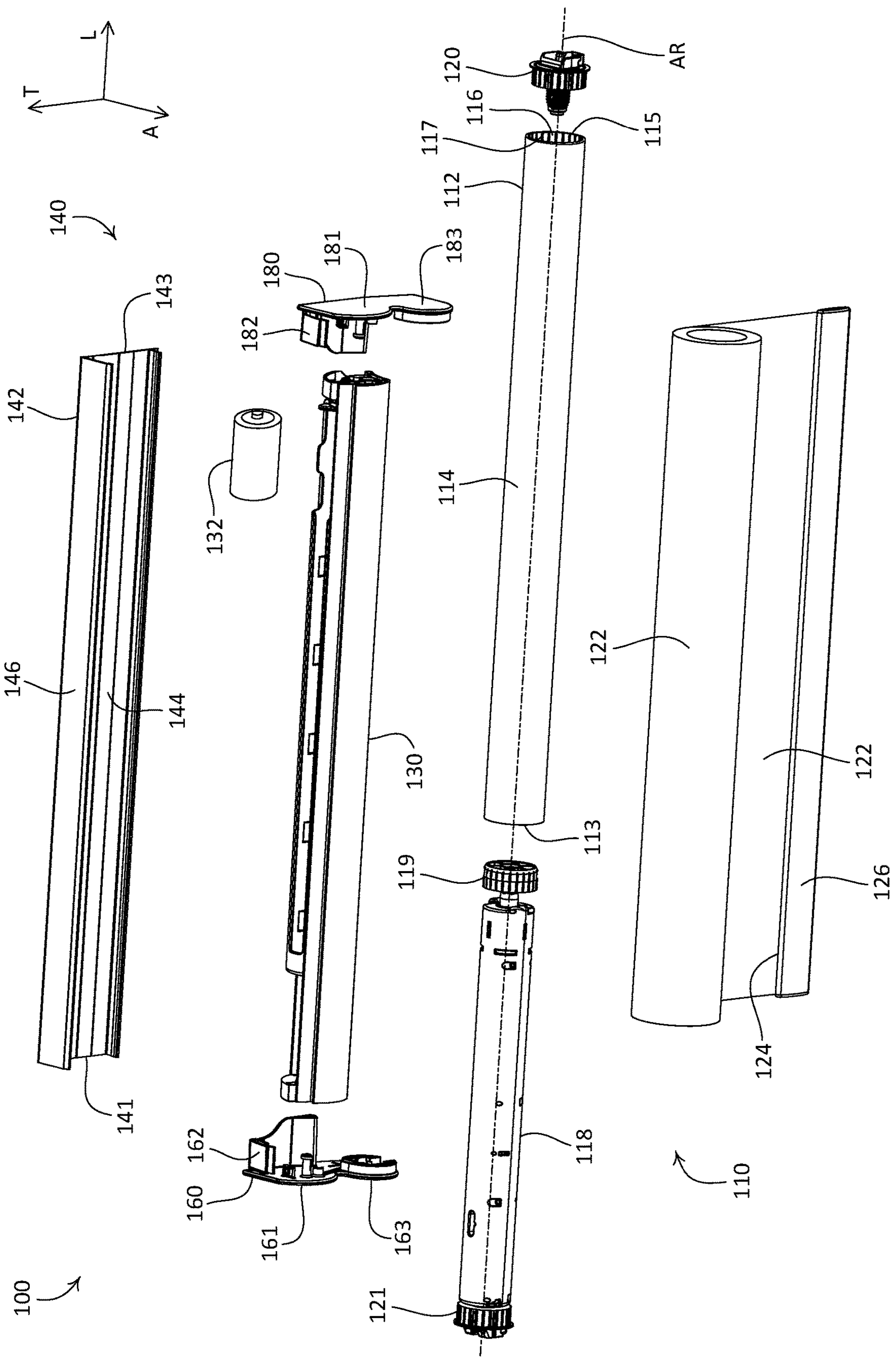
FIG. 1 is an exploded view depicting components of an example battery-powered roller shade for use in an opening.

FIG. 1 depicts an example motorized window treatment, in the form of a motorized roller shade 100 that may be mounted in front of an opening to prevent sunlight from entering a space and/or to provide privacy. The motorized roller shade 100 may be mounted to a structure that is proximate to the opening, such as a window frame, a wall, or other structure. As shown, the motorized roller shade 100 includes a shade assembly 110, a battery compartment 130, and a housing 140 that may be configured to support the shade assembly 110 and the battery compartment 130. The housing 140 may be configured as a mounting structure and/or a support structure for one or more components of the motorized roller shade 100.

As shown, the housing 140 includes a rail 142, a first housing bracket 160, and a second housing bracket 180. The first and second housing brackets 160, 180 may alternatively be referred to as mounting brackets. The illustrated rail 142 is elongate between a first end 141 and an opposed second end 143 along a longitudinal direction L. The rail 142, the first housing bracket 160, and the second housing bracket 180 may be configured to attach to one another in an assembled configuration. For example, the first housing bracket 160 may be configured to be attached to the first end 141 of the rail 142, and the second housing bracket 180 may be configured to be attached to the second end 143 of the rail 142. As shown, the first housing bracket 160 defines an attachment member 162 that is configured to engage the first end 141 of the rail 142, and the second housing bracket 180 defines an attachment member 182 that is configured to engage the second end 143 of the rail 142.

Figure 2:
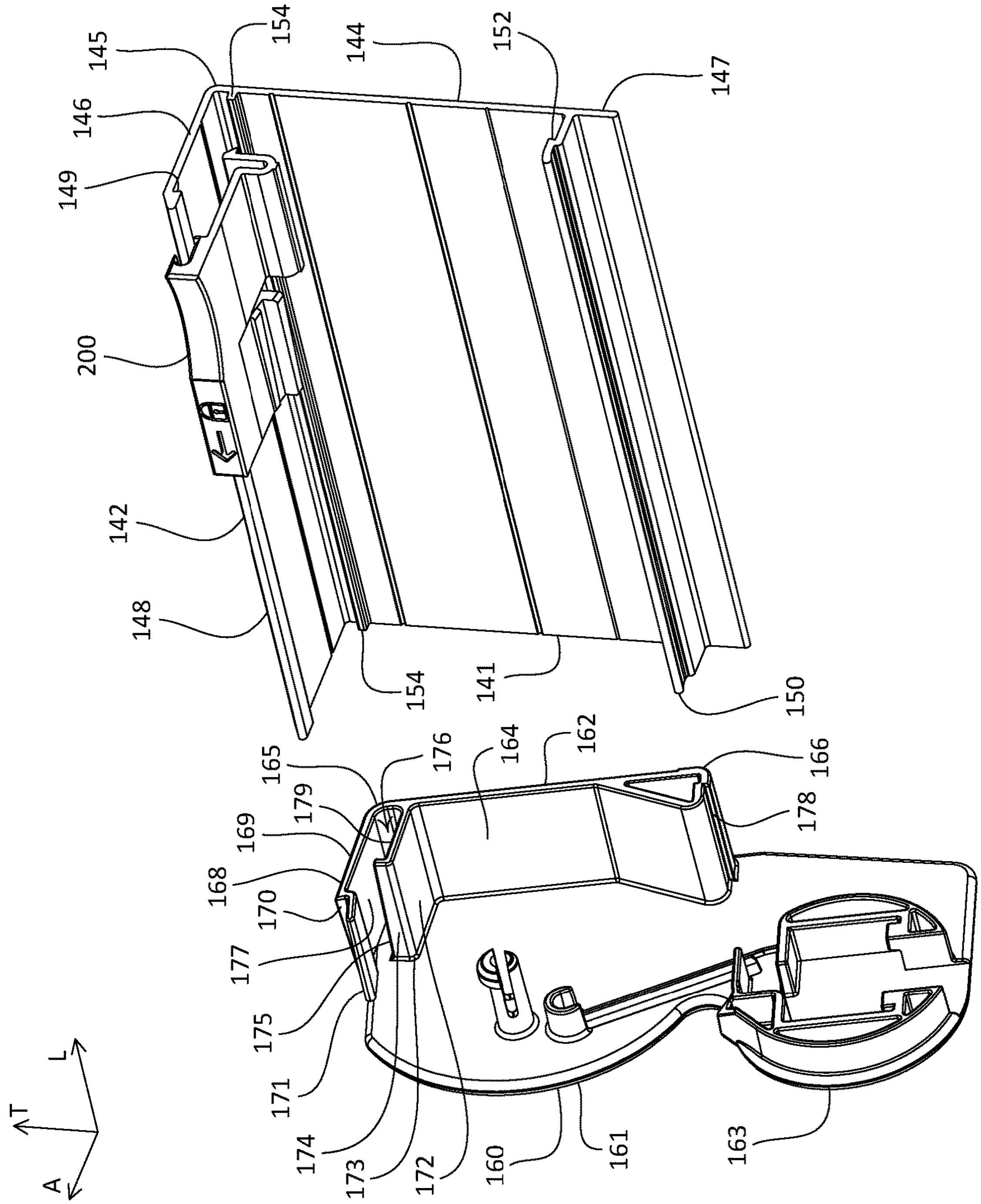
FIG. 2 is a perspective view depicting components of the example battery-powered roller shade depicted in FIG. 1, including a housing bracket, a rail, and an example mounting bracket lock that may be used to secure the housing bracket to the rail.

As depicted in FIG. 2, the attachment member 162 includes a rear wall 164 that extends out from the upper portion 161 of the first housing bracket 160 along the longitudinal direction L. The illustrated rear wall 164 extends along the transverse direction T from an upper end 165 of the attachment member 162 to a lower end 166 of the attachment member 162. The illustrated attachment member 162 further includes an upper wall 168 that extends forward from the upper end 165 of the rear wall 164. As shown, the upper wall 168 defines a first section 169 that extends from the upper end 165 of the rear wall 164 to a jog 170, along a direction that inclines relative to the lateral direction A with increasing distance from the upper end 165 of the rear wall 164. The illustrated upper wall 168 further defines a second section 171 that extends forward from the jog 170 along the lateral direction A.

The illustrated attachment member 162 further includes an intermediate wall 172 that extends forward from the rear wall 164, and that is spaced downward from the upper wall 168 along the transverse direction T. As shown, the intermediate wall 172 extends from the rear wall 164 to a free end 173, along a direction that inclines relative to the lateral direction A with increasing distance from the rear wall 164, such that the intermediate wall 172 is substantially parallel to the upper wall 168. As shown, the free end 173 is located rearward from the jog 170 of the upper wall 168. In this regard, the intermediate wall 172 may be shorter than the upper wall 168, for instance relative to the rear wall 164. The intermediate wall 172 may define a lip 174 at the free end 173 that extends upward from the free end 173, along a direction that is substantially perpendicular to the intermediate wall 172. As shown, the lip 174 may define a sloped upper surface 175 that declines away from the upper portion 161 of the first housing bracket 160.

The illustrated attachment member 162 defines a cavity 176 at the upper end 165 that is partially bounded by the upper wall 168, a portion of the rear wall 164, and the intermediate wall 172. The first section 169 of the upper wall 168 defines an inner surface 177 that faces into the cavity 176, and the intermediate wall 172 defines an inner surface 179 that faces into the cavity 176. As shown, the attachment member 162 further includes an edge 178 that protrudes from the lower end 166.

It should be appreciated that, although not shown in detail, the attachment member 182 of the second housing bracket 180 may be configured with similar features to those of the attachment member 162 of the first housing bracket 160. For example, the attachment member 182 of the second housing bracket 180 may be configured as a mirror image of the first attachment member 162, relative to a plane defined by the lateral direction A and the transverse direction T. It should further be appreciated that the rail 142, the first housing bracket 160, and the second housing bracket 180 are not limited to the attachment members illustrated and described herein.

One or more of the rail 142, the first housing bracket 160, or the second housing bracket 180, may be sized for mounting to a structure. For example, the rail 142 may be sized such that, with the first and second housing brackets 160, 180 attached to the rail 142, the rail 142 may be mounted to a structure in an opening (e.g., to a window frame). In such an example configuration, the rail 142 may define a length, for example as defined by the first and second ends 141, 143, such that the housing 140 may fit snugly in a window frame (e.g., with little clearance between the first and second housing brackets 160, 180 and adjacent structure of a window frame). This configuration may be referred to as an internal mount configuration. In another example, the rail 142 may be sized such that, with the first and second housing brackets 160, 180 attached to the rail 142, the rail 142 may be mounted to a structure above an opening (e.g., to a surface above a window). In such an example configuration, the rail 142 may define a length that is substantially equal to (e.g., slightly longer than) a width of the window opening. In still another example, one or more of the rail 142, the first housing bracket 160, or the second housing bracket 180 may be sized such that the motorized roller shade 100 may be mounted within a cavity defined by a window treatment pocket that may be mounted to a structure, such as structure surrounding a window. It should be appreciated, however, that the motorized roller shade 100 is not limited to these example mounting configurations.

The rail 142 may define any suitable shape. The illustrated rail 142 includes a rear wall 144 that extends from an upper end 145 to an opposed lower end 147, and includes an upper wall 146 that extends from the upper end 145. As shown, the rear wall 144 extends along a transverse direction T that is perpendicular to the longitudinal direction L. The upper wall 146 extends outward from the upper end 145 of the rear wall 144 to a free end 148, along a lateral direction A that is perpendicular to the longitudinal direction L and the transverse direction T. The free end 148 of the upper wall 146 may have a wedge-shaped cross-section that defines a ridge 149 that faces the rear wall 144.

The illustrated rail 142 further includes a lower wall 150 that extends outward from the rear wall 144 along the lateral direction A. As shown, the lower wall 150 is spaced from the lower end 147 of the rear wall 144, and is located nearer the lower end 147 than the upper end 145. The lower wall 150 may define a ridge 152 that faces the rear wall 144. The rear wall 144 may define a ledge 154 that extends outward from the rear wall 144 along the lateral direction A.

The first housing bracket 160 may be configured to be attached to the rail 142. For example, as shown, the attachment member 162 is configured to be snapped into place relative to the rail 142. In accordance with an example of attaching the first housing bracket 160 to the rail 142, the edge 178 of the attachment member 162 may be seated behind the ridge 152 of the lower wall 150 of the rail 142. The first housing bracket 160 may then be pivoted about the ridge 152, such that the upper end 165 of the attachment member 162 moves toward the upper end 145 of the rear wall 144 of the rail 142. As the first housing bracket 160 pivots toward an attached position relative to the rail 142, the upper end 165 of the attachment member 162 may pass under the ledge 154 of the rear wall 144, and the jog 170 may make contact with the free end 148 of the upper wall 146. As the first housing bracket 160 moves into the attached position, the jog 170 may snap into place behind the ridge 149 of the upper wall 146.

One or both of the rear wall 144 and the upper wall 146 may be configured to be mounted to a structure. For example, one or both of the rear wall 144 and the upper wall 146 may define one or more respective apertures (not shown) that are configured to receive fasteners (e.g., screws, lag bolts, etc.).

The rail 142, the first housing bracket 160, and the second housing bracket 180, when in an assembled configuration, may define a cavity. The shade assembly 110 and the battery compartment 130 may be disposed in the cavity, for example when the motorized roller shade 100 is in an assembled configuration. When the motorized roller shade 100 is in an assembled configuration, the housing 140 may be open at the front and bottom, such that the shade assembly 110 and the battery compartment 130 are exposed. The motorized roller shade 100 may optionally include a fascia (not shown) that is configured to conceal one or more components of the motorized roller shade 100, such as the battery compartment 130 and portions of the shade assembly 110.

As shown, the shade assembly 110 includes a roller tube 112, a motor drive unit 118, an idler 120, a covering material 122 (e.g., a shade fabric), and a hembar 126. The roller tube 112 may have a tube body 114 that is elongate along the longitudinal direction L from a first end 113 to an opposed second end 115. The tube body 114 may define any shape, such as the illustrated cylindrical shape. As shown, the roller tube 112 is hollow, and open at the first and second ends 113, 115. The roller tube 112 may be configured to at least partially receive the motor drive unit 118, and to at least partially receive the idler 120. As shown, the roller tube 112 is configured such that a portion of the motor drive unit 118 may be disposed in the first end 113, and such that a portion of the idler 120 may be disposed in the second end 115.

The tube body 114 may define an inner surface 116 that is configured to operatively engage with the motor drive unit 118. For example, as shown, the tube body 114 defines a plurality of splines 117 that extend radially inward from the inner surface 116. The roller tube 112 may be configured to operatively engage with the motor drive unit 118 via the plurality of splines 117. For example, the splines 117 may be configured to operatively engage with a component of the motor drive unit 118, such that rotational torque may be transferred to the roller tube 112 from the motor drive unit 118, thereby causing the roller tube 112 to rotate about an axis of rotation AR. The axis of rotation AR of the roller tube 112 may also be referred to as a central axis of the roller tube 112.

As shown, the splines 117 extend parallel to the longitudinal direction L, and are spaced apart from each other equally along a circumference of the inner surface 116 of the roller tube 112. Each of the illustrated splines 117 extends from the first end 113 to the second end 115 of the tube body 114. It should be appreciated that the roller tube 112 is not limited to illustrated configuration and/or geometry of splines 117. It should further be appreciated that the roller tube 112 may be alternatively configured to operably engage with the motor drive unit 118. For example, in accordance with an alternative configuration of the roller tube 112, the tube body 114 may define a smooth inner surface 116, and may define an opening that extends through the tube body 114 at a location such that the roller tube 112 may be operatively coupled to the motor drive unit 118 via one or more fasteners that may be disposed into the opening and that may engage the motor drive unit 118 (e.g., such as screws, pins, clips, or the like).

The illustrated motor drive unit 118 may be configured to be disposed into the first end 113 of the roller tube 112. One or more components of the motor drive unit 118 may be configured to engage with the plurality of splines 117 of the roller tube 112. As shown, the motor drive unit includes a drive hub 119 that defines a plurality of grooves that are configured to operably engage with corresponding ones of the splines 117, such that operation of the motor drive unit 118 may cause the roller tube 112 to rotate. The motor drive unit 118 may further include an integrated idler 121 that defines a plurality of grooves that are configured to engage with corresponding ones of the splines 117. The idler 120 may similarly define a plurality of grooves that are configured to engage with corresponding ones of the splines 117.

The covering material 122 may define an upper end (not shown) that is configured to be operably attached to the roller tube 112, and an opposed lower end 124 that is configured as a free end. Rotation of the roller tube 112 about the axis of rotation AR, for example rotation caused by the motor drive unit 118, may cause the covering material 122 to wind onto, or to unwind from, the roller tube 112. In this regard, the motor drive unit 118 may adjust the covering material 122, for instance between raised and lowered positions of the covering material 122.

Rotation of the roller tube 112 in a first direction about the axis of rotation AR may cause the covering material 122 to unwind from the roller tube 112, for example as the covering material 122 is operated to a lowered position relative to an opening (e.g., a window). Rotation of the roller tube 112 in a second direction, about the axis or rotation AR, that is opposite the first direction may cause the covering material 122 to wind onto the roller tube 112, for example as the covering material 122 is operated to a raised position relative to the opening.

The covering material 122 may be made of any suitable material, or combination of materials. For example, the covering material 122 may be made from one or more of "scrim," woven cloth, non-woven material, light-control film, screen, or mesh. The hembar 126 may be attached to the lower end 124 of the covering material 122, and may be weighted, such that the hembar 126 causes the covering material 122 to hang (e.g., vertically) in front of one or more windows.

The motor drive unit 118 may be configured to enable control of the rotation of the roller tube 112, for example by a user of the motorized roller shade 100. For example, a user of the motorized roller shade 100 may control the motor drive unit 118 such that the covering material 122 is moved to a desired position. The motor drive unit 118 may include a sensor that monitors a position of the roller tube 112. This may enable the motor drive unit 118 to track a position of the covering material 122 relative to respective upper and lower limits of the covering material 122. The upper and lower limits may be specified by an operator of the motorized roller shade 100, and may correspond to the raised and lowered positions of the covering material 122, respectively.

The motor drive unit 118 may be manually controlled (e.g., by actuating one or more buttons) and/or wirelessly controlled (e.g., using an infrared (IR) or radio frequency (RF) remote control unit). Examples of motor drive units for motorized roller shades are described in greater detail in U.S. Pat. No. 6,983,783, issued Jan. 10, 2006, entitled "Motorized Shade Control System," U.S. Pat. No. 7,839,109, issued Nov. 23, 2010, entitled "Method Of Controlling A Motorized Window Treatment," U.S. Pat. No. 8,950,461, issued Jan. 21, 2015, entitled "Motorized Window Treatment," and U.S. Pat. No. 9,045,939, issued May 13, 2015, entitled "Battery-Powered Motorized Window Treatment Having A Service Position," the entire contents of each of which are incorporated herein by reference. It should be appreciated, however, that any motor drive unit or drive system may be used to control the roller tube 112.

The motorized roller shade 100 may include an antenna (not shown) that is configured to receive wireless signals (e.g., RF signals from a remote control device). The antenna may be in electrical communication with the motor drive unit 118 (e.g., via a control circuit or PCB), such that one or more wireless signals received from a remote control unit may cause the motor drive unit 118 to move the covering material 122 (e.g., between the lowered and raised positions). The antenna may be integrated with (e.g., pass through, be enclosed within, and/or be mounted to) one or more of the shade assembly 110, the battery compartment 130, the housing 140, or respective components thereof.

The battery compartment 130 may be configured to retain one or more batteries 132. The illustrated battery 132 may be, for example, a D cell (e.g., IEC R20) battery. One or more components of the motorized roller shade 100, such as the motor drive unit 118, may be powered by the one or more batteries 132. However, it should be appreciated that the motorized roller shade 100 is not limited to the illustrated battery-powered configuration. For example, the motorized roller shade 100 may be alternatively configured such that one or more components thereof, such as the motor drive unit 118, may be powered by an alternating current (AC) source, a direct current (DC) source, or any combination of power sources.

The battery compartment 130 may be configured to be operable between an opened position and a closed position, such that one or more batteries 132 may be accessible when the battery compartment 130 is in the opened position. Examples of battery compartments for motorized roller shades are described in greater detail in U.S. Patent Application Publication No. 2014/0305602, published Oct. 16, 2014, entitled "Integrated Accessible Battery Compartment For Motorized Window Treatment," the entire contents of which is incorporated herein by reference.

The housing 140 may be configured to support one or both of the shade assembly 110 and the battery compartment 130. For example, the first and second housing brackets 160, 180 may be configured to support the shade assembly 110 and/or the battery compartment 130. As shown, the first and second housing brackets 160, 180 are configured to support the shade assembly 110 and the battery compartment 130 such that the battery compartment 130 is located (e.g., is oriented) above the shade assembly 110 when the motorized roller shade 100 is mounted to a structure. It should be appreciated that the motorized roller shade 100 is not limited to the illustrated orientation of the shade assembly 110 and the battery compartment 130. For example, the housing 140 may be alternatively configured to otherwise support the shade assembly 110 and the battery compartment 130 relative to each other (e.g., such that the battery compartment 130 is located below the shade assembly 110).

As shown, the first housing bracket 160 defines an upper portion 161 and a lower portion 163, and the second housing bracket 180 defines an upper portion 181 and a lower portion 183. The upper portion 161 of the first housing bracket 160 may be configured to support a first end of the battery compartment 130, and the upper portion 181 of the second housing bracket 180 may be configured to support a second end of the battery compartment 130. The upper portions 161, 181 of the first and second housing brackets 160, 180, respectively, may be configured to operably support the battery compartment 130, such that the battery compartment 130 is operable to provide access to one or more batteries 132 when the motorized roller shade 100 is mounted to a structure.

The lower portion 163 of the first housing bracket 160 may be configured to support the idler 121, and thus the first end 113 of the tube body 114 of the roller tube 112. The lower portion 183 of the second housing bracket 180 may be configured to support the idler 120, and thus the second end 115 of the tube body 114 of the roller tube 112. The lower portions 163, 183 of the first and second housing brackets 160, 180, respectively, may be configured to operably support the support the shade assembly 110, such that the covering material 122 may be moved (e.g., between the lowered and raised positions).

The housing 140 may be configured to be mounted to a structure using one or more fasteners (e.g., one or more screws). For example, one or more of the rail 142, the first housing bracket 160, or the second housing bracket 180 may define one or more respective apertures that are configured to receive fasteners.

The components of the housing 140 may be made of any suitable material or combination of materials. For example, the rail 142 may be made of metal, and the first and second housing brackets 160, 180 may be made of plastic. Although the illustrated housing 140 includes a one piece rail 142 it should be appreciated that the rail may include first and second rail sections that may be configured to attach to one another. One or more components of the housing 140 (e.g., one or more of the rail 142, the first housing bracket 160, or the second housing bracket 180) may be wrapped in a material (e.g., fabric), for instance to enhance the aesthetics of the housing 140.

FIG. 2 depicts components of the housing 140 of the motorized roller shade 100, including the first attachment member 162 and the rail 142. For the sake of clarity, only a portion of the rail proximate to the first end 141 is shown. FIG. 2 further depicts an example mounting bracket lock 200 that is attachable to the motorized roller shade 100, and that may operate to secure the first attachment member 162 to the first end 141 of the rail 142. In this regard, the mounting bracket lock 200 may be a component of the motorized roller shade 100.

Referring additionally to FIGS. 3A-3E, the example mounting bracket lock 200 includes a body 202 that is mountable to the rail 142 of the motorized roller shade 100. As shown, the body 202 defines a front wall 204 that is elongate from a first end 206 to an opposed second end 208, and that extends along the longitudinal direction L.

The mounting bracket lock 200 may be configured to be operatively coupled to the rail 142. For example, when the mounting bracket lock 200 is attached to the rail 142, the mounting bracket lock 200 may be slidable along the rail 142 (e.g., along the longitudinal direction L). As shown, the body 202 of the mounting bracket lock 200 may define a cavity 210 that extends into the second end 208 and through a first portion 212 of the body 202, along the longitudinal direction L. The cavity 210 may be sized to be disposed onto the free end 148 of the upper wall 146 of the rail 142, such that the mounting bracket lock 200 is slidable along the rail 142, for example toward or away from the first housing bracket 160. In this regard, the first portion 212 of the body 202 of the mounting bracket lock 200 may be configured to slidably attach to the rail 142.

The mounting bracket lock 200 may be configured to be retained in slidable attachment along the rail 142. For example, as shown, the body 202 of the mounting bracket lock 200 may define a retaining wall 211 that extends upward from the body 202 near a rear of the cavity 210. The illustrated retaining wall 211 extends along the first portion 212 of the body 202. When the mounting bracket lock 200 is attached to the rail 142, the cavity 210 may be disposed over the free end 148 of the rail 142, and the mounting bracket lock 200 may be pivoted about the free end 148, toward the upper wall 146 and the rear wall 144, until the retaining wall 211 snaps into place behind the ridge 149 of the upper wall 146. The cavity 210 and the retaining wall 211 may cooperate to retain the mounting bracket lock 200 in a slidably attached position on the rail 142. The free end 148 of the rail 142 (e.g., including the ridge 149) may be referred to as a first section of the rail 142, for example relative to the mounting bracket lock 200. In this regard, the cavity 210 is mountable over the first section of the rail 142.

In accordance with the illustrated example of the mounting bracket lock 200, the body 202 may further define a resilient retention strap 214 that is configured to slidably engage with the rail 142, and that may operate to retain the mounting bracket lock 200 in a slidable configuration relative to the rail 142. As shown, the first portion 212 of the body 202 may define a rear wall 216 that extends rearward from the front wall 204 to a free end 218, along the lateral direction A. As shown, the retention strap 214 may be defined at the free end 218 of the rear wall 216. The illustrated retention strap 214 has a "U" shaped profile that extends from the free end 218 of the rear wall 216 to a beveled end 220 that is spaced rearward along the lateral direction A and upward along the transverse direction T from the free end 218 of the rear wall 216. As shown, the beveled end 220 may define an abutment surface 222 that may be parallel to the rear wall 216.

Figure 5:
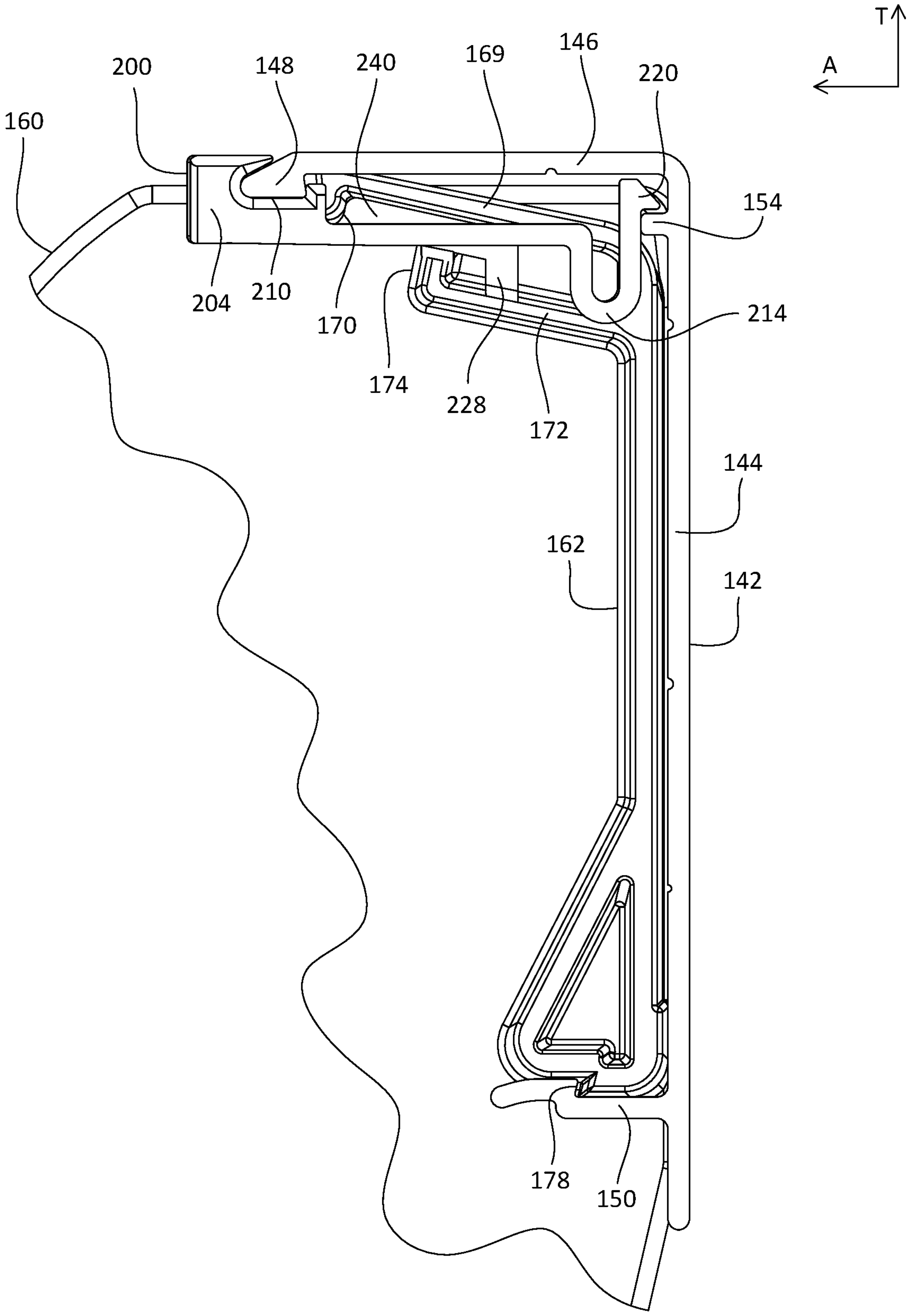
FIG. 5 is a zoomed-in side elevation view of a portion of the assembly illustrated in FIGS. 4A and 4B.

In accordance with an example process of slidably attaching the mounting bracket lock 200 to the rail 142, the cavity 210 of the first portion 212 of the body 202 may be disposed onto (e.g., snapped into place over) the free end 148 of the upper wall 146 of the rail 142. The beveled end 220 of the retention strap 214 may then be pivoted toward the upper end 145 of the rear wall 144 of the rail 142, and may make contact with the ledge 154 of the rear wall 144. Contact between the beveled end 220 and the ledge 154 may cause the beveled end 220 to deflect forward toward the free end 218 of the rear wall 216 of the body 202, until the beveled end 220 passes beyond the ledge 154, at which point the retention strap 214 may resiliently return to a rest state, with the abutment surface 222 abutting an upper surface of the ledge 154 (e.g., as shown in FIG. 5). During operation of the mounting bracket lock 200, the abutment surface 222 may slide along the ledge 154. The ledge 154 may be referred to as a second section of the rail 142. In this regard, the abutment surface 222, and more generally the retention strap 214, may slide along the second section of the rail 142 and may slidably engage with the second section of the rail 142 to retain the mounting bracket lock 200 in a slidable configuration relative to the rail 142.

The example mounting bracket lock 200 may be configured to releasably engage with a portion of the attachment member 162 of the first housing bracket 160, in order to prevent the first housing bracket 160 from detaching from the rail 142. For example, as shown, the body 202 of the mounting bracket lock 200 may define an opening 224 that extends into the first end 206 and through a second portion 226 of the body 202, toward the first portion 212, along the longitudinal direction L.

Figure 6:
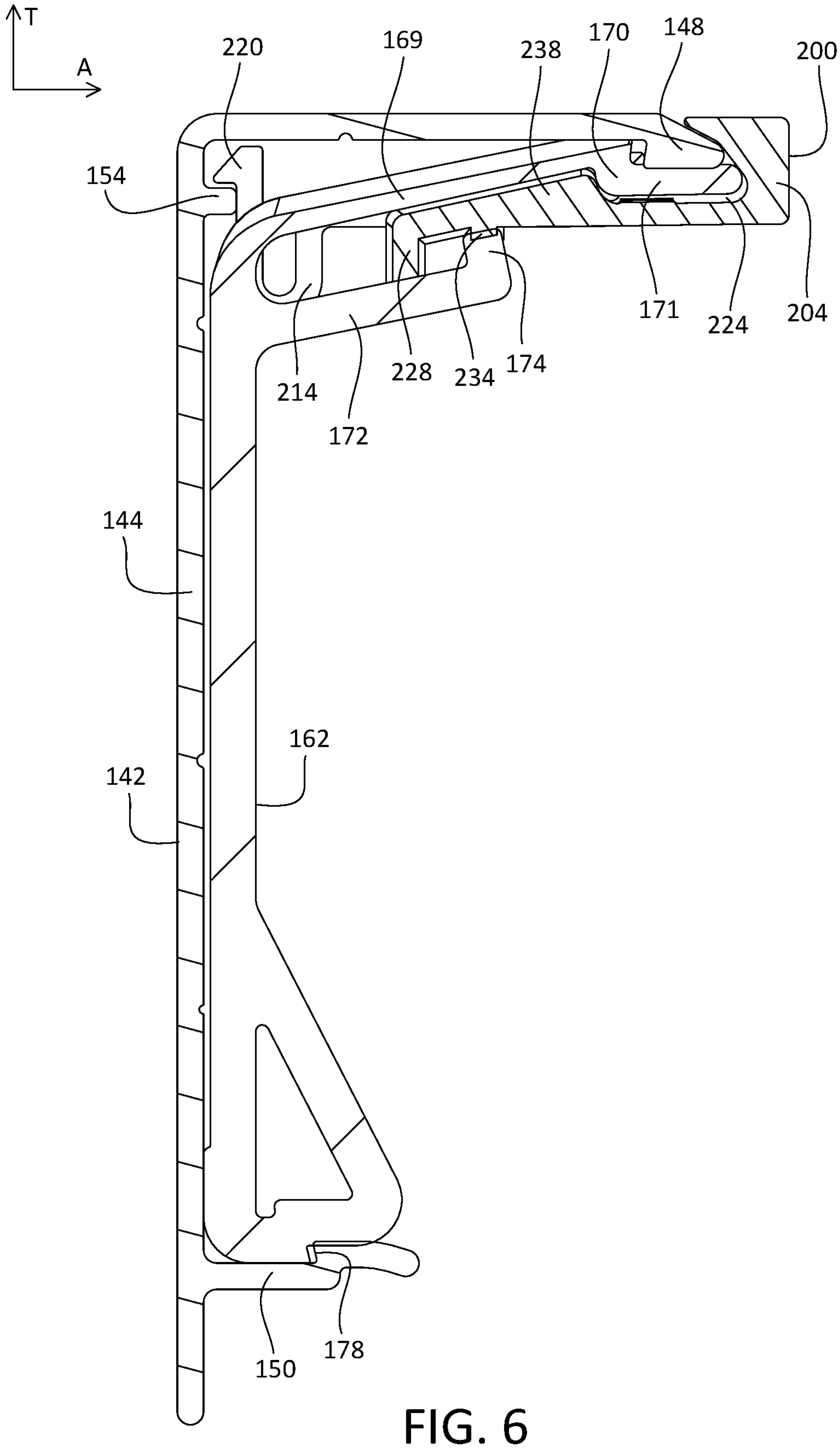
FIG. 6 is a section view of the assembly illustrated in FIG. 5, projected along a direction extending out of the page.

The opening 224 may be open to the cavity 210 and may be configured to receive a corresponding portion of the free end 148 of the rail 142, and to further receive a portion of the attachment member 162 of the first housing bracket 160 when the mounting bracket lock 200 is in a locked position relative to the first housing bracket 160 (e.g., as shown in FIG. 6). For example, as shown, the opening 224 may be configured to receive a portion of the second section 171 of the upper wall 168 of the attachment member 162. In this regard, the opening 224 of the second portion 226 of the body 202 may define a cross section that is larger than a cross section of the cavity 210 of the first portion 212. The second portion 226 of the body 202 may define a length L1 along the longitudinal direction L that is substantially equal to a length L2 of the upper wall 168 of the attachment member 162 along the longitudinal direction L.

The body 202 of the mounting bracket lock 200 may be configured to engage with the attachment member 162 of the first housing bracket 160 when the mounting bracket lock 200 is operated to the locked position. For example, the body 202 may define one or more projections that extend from the body 202 and that may be configured to engage with corresponding portions of the attachment member 162 of the first housing bracket 160 when the mounting bracket lock 200 is operated to the locked position.

Figure 3A:
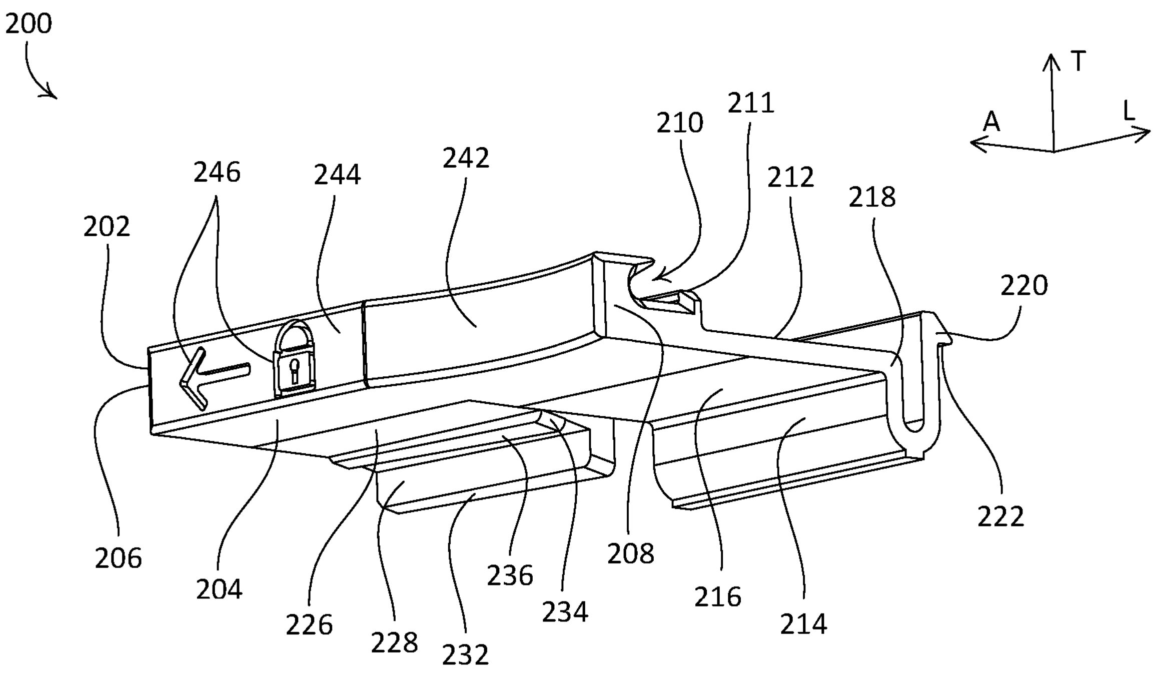
FIG. 3A is a perspective view of the example mounting bracket lock depicted in FIG. 2.
Figure 3B:
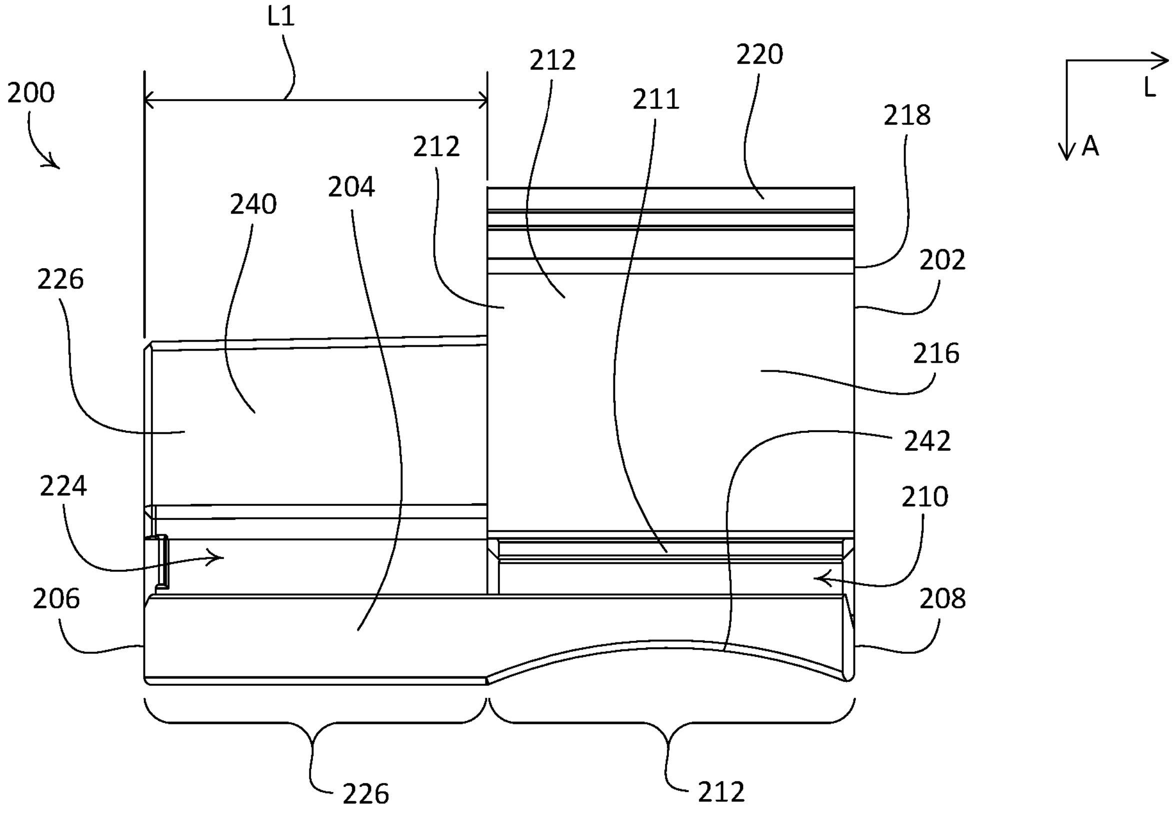
FIG. 3B is a top view of the example mounting bracket lock depicted in FIG. 2.
Figure 3C:
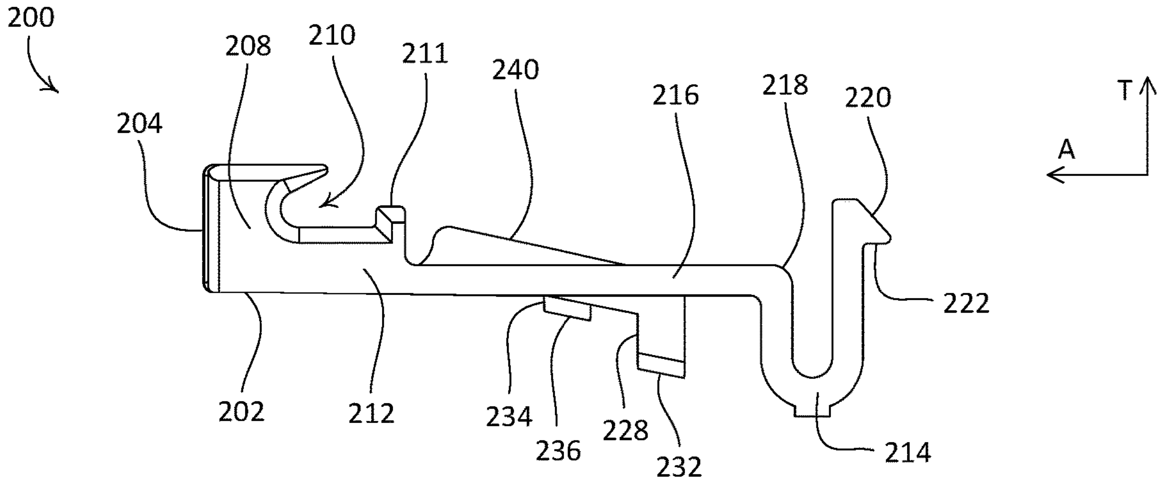
FIG. 3C is a right elevation view of the example mounting bracket lock depicted in FIG. 2.
Figure 3D:
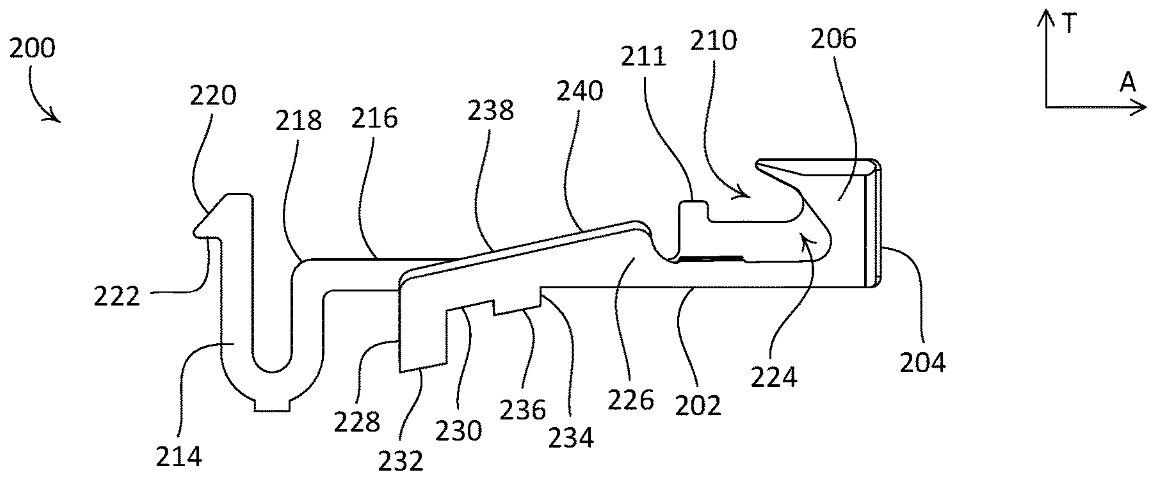
FIG. 3D is a left elevation view of the example mounting bracket lock depicted in FIG. 2.
Figure 3E:
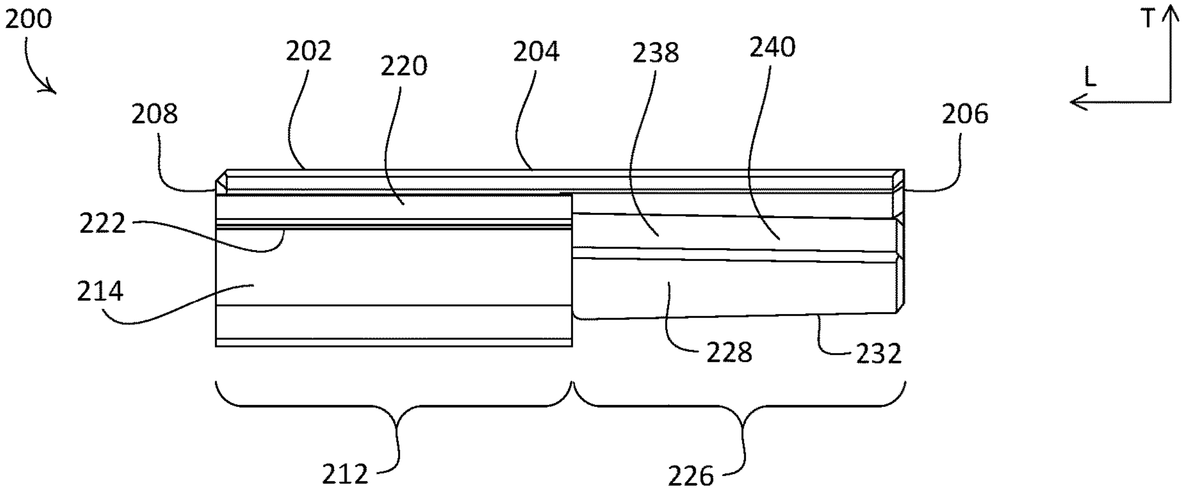
FIG. 3E is a rear elevation view of the example mounting bracket lock depicted in FIG. 2.

As shown, the second portion 226 of the body 202 may define a projection 228 that extends downward from a lower surface 230 of the second portion 226 of the body 202. The projection 228 may be referred to as a first projection 228. The first projection 228 may be elongate along the longitudinal direction L, along the length L1 of the second portion 226, and may define a lower surface 232 that is sloped upward relative to the longitudinal direction L with increasing distance from the first portion 212 toward the first end 206 of the body 202 (e.g., as shown in FIGS. 3A and 3E). As shown, the lower surface 232 may additionally be sloped along a direction that declines, relative to the lateral direction A, with increasing distance from the front wall 204 (e.g., as shown in FIGS. 3C and 3D), and that may extend parallel to the inner surface 179 of the intermediate wall 172 of the attachment member 162.

The second portion 226 of the body 202 may define a projection 234 that extends downward from the lower surface 230 of the second portion 226 of the body 202. The projection 234 may be referred to as a second projection 234. The second projection 234 may be elongate along the longitudinal direction L, along the length L1 of the second portion 226, and may define a lower surface 236 that is sloped upward relative to the longitudinal direction L with increasing distance from the first portion 212 toward the first end 206 of the body 202 (e.g., as shown in FIG. 3A). As shown, the lower surface 236 may additionally be sloped along a direction that declines relative to the lateral direction A with increasing distance from the front wall 204 (e.g., as shown in FIGS. 3C and 3D), and that may extend parallel to the upper surface 175 of the lip 174 of the intermediate wall 172 of the attachment member 162. In accordance with the illustrated mounting bracket lock 200, the second projection 234 may extend downward from the lower surface 230 of the second portion 226 through a distance that is shorter than that through which the first projection 228 extends downward from the lower surface 230.

The second portion 226 of the body 202 may define a projection 238 that extends upward relative to the lower surface 230 of the second portion 226 of the body 202. The projection 238 may be referred to as a third projection 238. The third projection 238 may be elongate along the longitudinal direction L, along the length L1 of the second portion 226, and may define an upper surface 240 that is sloped downward relative to the longitudinal direction L with increasing distance from the first portion 212 toward the first end 206 of the body 202 (e.g., as shown in FIG. 3E). As shown, the upper surface 240 may additionally be sloped along a direction that declines relative to the lateral direction A with increasing distance from the front wall 204 (e.g., as shown in FIGS. 3C and 3D), and that may extend parallel to the inner surface 177 of the first section 169 of the upper wall 168 of the attachment member 162.

As shown in FIG. 3E, in accordance with the sloped lower surface 232 of the first projection 228 and the sloped upper surface 240 of the third projection 238, the second portion 226 of the body 202 may taper with increasing distance from the first portion 212 toward the first end 206 of the body 202, such that the second portion 226 of the body 202 may define a wedge shaped profile. In this regard, the first projection 228 and the third projection 238 may together define a wedge shape that may be configured to generate a friction fit when disposed into a corresponding portion of the attachment member 162 of the first housing bracket 160, for instance within the cavity 176.

The mounting bracket lock 200 may be configured to assist a user thereof, for example in accordance with assembly of a window treatment that includes the mounting bracket block 200 (e.g., the motorized roller shade 100), and/or in accordance with subsequent maintenance of such a window treatment. For example, as shown, the first portion 212 of the body defines an arc shaped groove 242 that extends into a front surface 244 of the front wall 204. The groove 242 may be configured to receive a finger or thumb, for example, of a user of the mounting bracket lock 200, and may apply a surface upon which force may be applied by the user to cause the mounting bracket lock 200 to slide along the rail 142. In this regard, the mounting bracket lock 200 may be operated between the locked and unlocked positions without the use of tools.

The mounting bracket lock 200 may include one or more indicia 246 that are related to operation thereof. For example, as shown, the second portion 226 of the body 202 defines indicia 246 in the form of a directional arrow and an image of a lock that are recessed into the front surface 244 of the front wall 204, and that indicate that the mounting bracket lock 200 may be slid along the rail 142 toward the first end 141 of the rail 142 to operate the mounting bracket lock 200 into a locked position relative to the first housing bracket 160. In this regard, the mounting bracket lock 200 may be self-teaching with regard to its operation, for instance such that prior instruction may not be needed to understand operation of the mounting bracket lock 200.

Figure 4A:
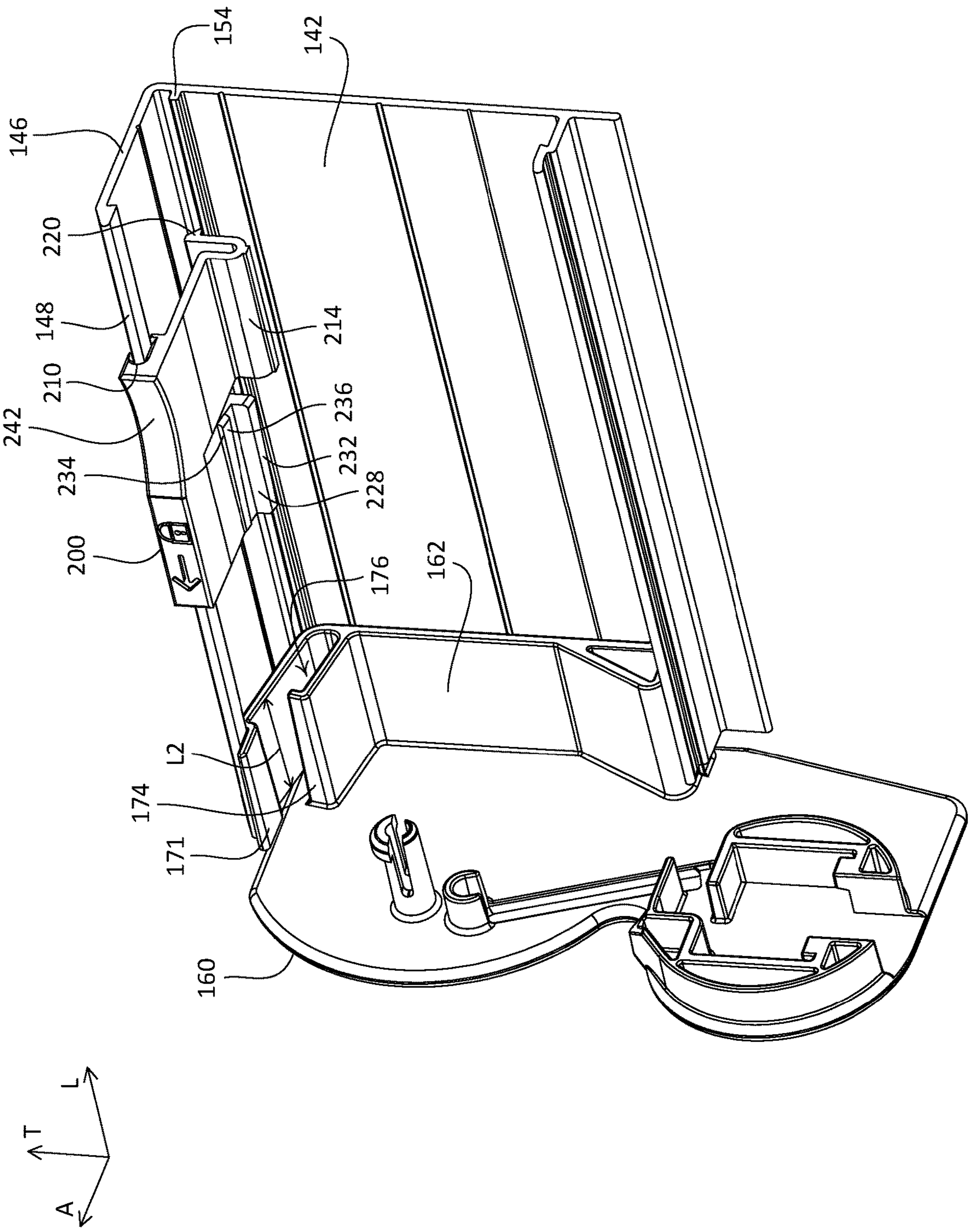
FIG. 4A is a perspective view of an assembly of the components illustrated in FIG. 2, with the housing bracket attached to the rail and the example mounting bracket lock in an unlocked position.
Figure 4B:
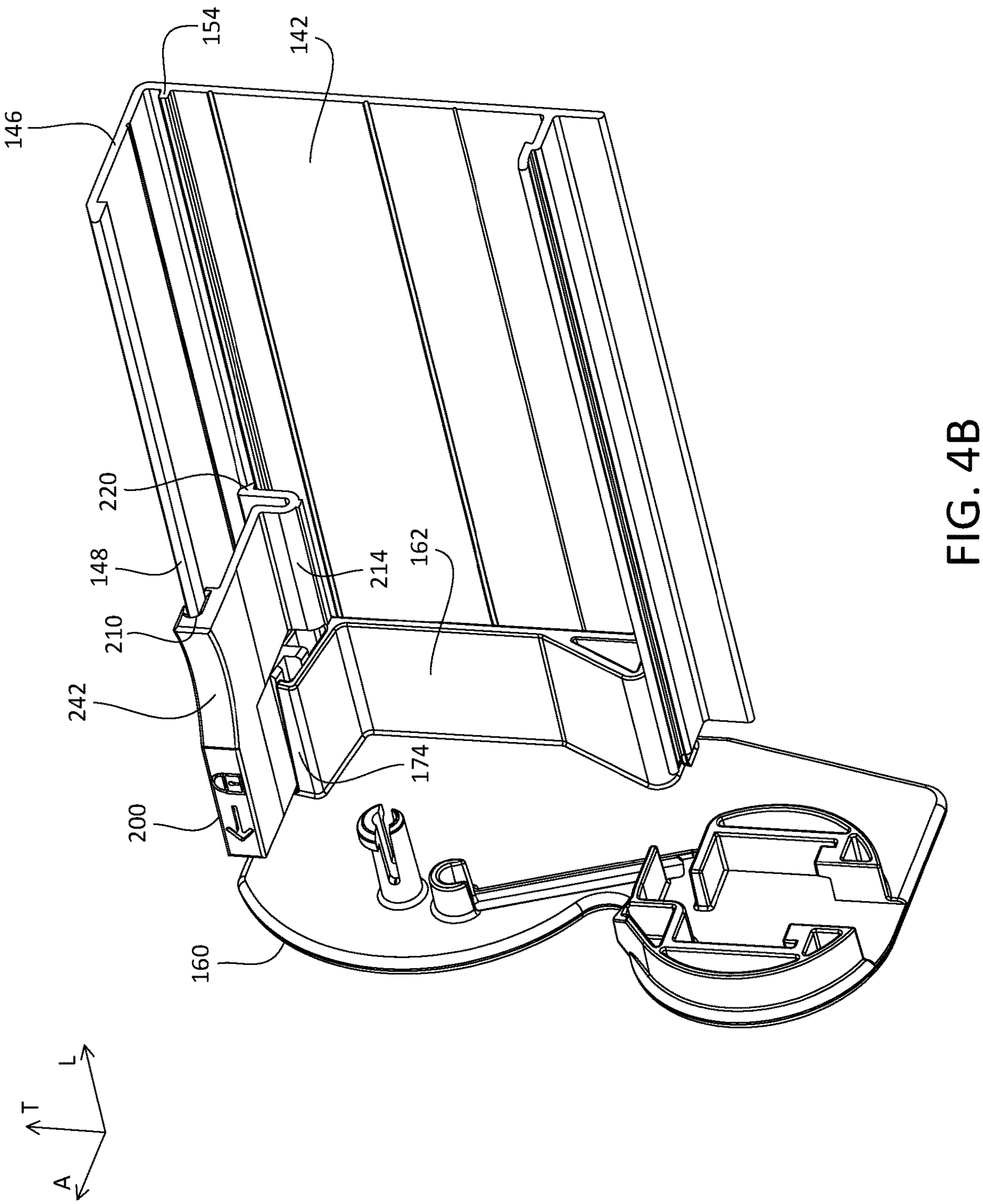
FIG. 4B is a perspective view of the assembly illustrated in FIG. 4A, with the example mounting bracket lock in a locked position.

FIGS. 4A and 4B depict an example of operation of the mounting bracket lock 200 from an unlocked position to a locked position. FIG. 4A depicts a partial assembly of components of the housing 140 of the motorized roller shade 100, in which the attachment member 162 of the first housing bracket 160 is attached to the first end 141 of the rail 142, for example as described herein. The mounting bracket lock 200 is slidably attached to the rail 142, and is in an unlocked position in which the mounting bracket lock 200 is spaced from the attachment member 162. With the mounting bracket lock 200 in the unlocked position, the first housing bracket 160 may be detached from the rail 142. The mounting bracket lock 200 may be operated to a locked position by causing the mounting bracket lock 200 to slide toward the first end 141 of the rail 142, for example by applying pressure to the groove 242. As the mounting bracket lock 200 moves into the locked position, the opening 224 may receive the second section 171 of the upper wall 168 of the attachment member 162, thereby securing the first housing bracket 160 in position relative to the rail 142, such that the first housing bracket 160 is prevented from becoming detached from the rail 142. In this regard, the mounting bracket lock 200 may be secured in place in the locked position without the use of external fasteners (e.g., screws). The mounting bracket lock 200 may be configured such that if the attachment member 162 (e.g., the second section 171 of the upper wall 168) is not in a fully attached position relative to the rail 142, the mounting bracket lock 200 will not slide into the locked position, for example via the dimensions and/or tolerances with which the opening 224 is configured.

Additionally, as the mounting bracket lock 200 moves into the locked position the second portion 226 of the body 202 may be received in the cavity 176 of the attachment member 162. The second portion 226 may generate a friction fit within the cavity 176, which may secure the mounting bracket lock 200 in position relative to the first housing bracket 160. More specifically, the lower surface 232 of the first projection 228 may abut (e.g., engage with) the inner surface 179 of the intermediate wall 172 of the attachment member 162, and the upper surface 240 of the third projection 238 may abut (e.g., engage with) the inner surface 177 of the first section 169 of the upper wall 168 of the attachment member 162. The wedge shape of the second portion 226 may cause the lower surface 232 of the first projection 228 and the upper surface 240 of the third projection 238 to apply friction forces against inner surfaces 179, 177, respectively, of the cavity 176.

Furthermore, as the mounting bracket lock 200 moves into the locked position, the lower surface 236 of the second projection 234 may abut (e.g., engage with) the upper surface 175 of the lip 174 of the attachment member 162. Friction force applied by the lower surface 236 of the second projection 234 against the upper surface 175 of the lip 174 may contribute to securement of the first housing bracket 160 in position relative to the rail 142.

In an example operation of removing the first housing bracket 160 from the rail 142, the mounting bracket lock 200 may be operated to an unlocked position (e.g., as shown in FIG. 4A) by causing the mounting bracket lock 200 to slide away from the first end 141 of the rail 142, for instance by applying pressure to the groove 242. With the mounting bracket lock 200 in an unlocked position, the first housing bracket 160 may be detached from the rail 142. For example, downward pressure may be applied to the second section 171 of upper wall 168 of the attachment member 162, thereby causing the jog 170 to slip past the ridge 149 of the upper wall 146 of the rail 142. The upper end 165 of the attachment member 162 may then be pivoted downward and away from the upper end 145 of the rear wall 144. As the attachment member 162 pivots forward from the rear wall 144, the edge 178 may become unseated from the ridge 152 of the lower wall 150 of the rail 142, such that the first housing bracket 160 may then be removed from the rail 142.

It should be appreciated that the mounting bracket lock 200 is not limited to the example configuration illustrated and described herein. For example, the mounting bracket lock 200 may be alternatively provided in a configuration that is mirrored relative to the illustrated mounting bracket lock 200 (e.g., reflected in a plane defined by the transverse direction T and the lateral direction A). Such an alternate configuration of the mounting bracket lock 200 may be used, for example, to secure the second housing bracket 180 to the second end 143 of the rail 142. Moreover, the mounting bracket lock 200 may be alternatively configured with more, fewer, or different projections that extend from the first and/or second portions 212, 226 of the body 202. In accordance with such alternate configurations, the projections 228, 234, and 238 may be referred to as other than the first, second, and third projections, respectively.

It should further be appreciated one or more mounting bracket locks 200 may be provided with other components of the housing of a window treatment, such as the first and second housing brackets 160, 180, and the rail 142. In this regard, the mounting bracket lock 200 may be a component of a window treatment housing (e.g., the housing 140), and more generally may be a component of a window treatment (e.g., the motorized roller shade 100). It should further still be appreciated that one or more mounting bracket locks 200 may be provided with a window treatment kit, or may be provided separately, for example in accordance with a retrofit installation of the mounting bracket locks 200. It should further still be appreciated that the example mounting bracket lock 200 is not limited to use with the housing of a roller shade window treatment, such as the motorized roller shade 100. For example, the mounting bracket lock 200 may be adapted for use with the respective housings of other types of window treatments, such as roman shades, venetian blinds, draperies, and so on.

Figure 7:
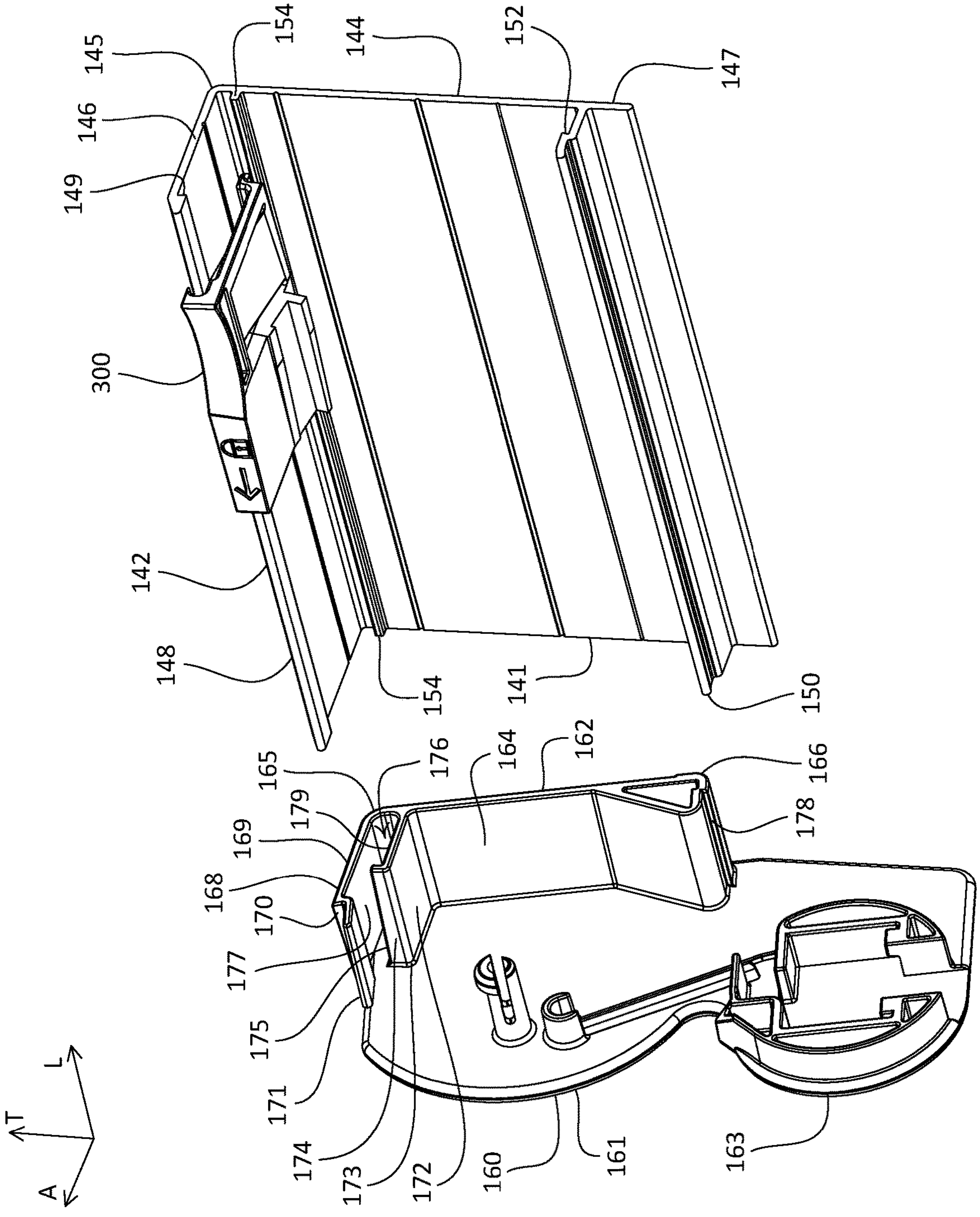
FIG. 7 is a perspective view depicting components of the example battery-powered roller shade depicted in FIG. 1, including the housing bracket, the rail, and another example mounting bracket lock that may be used to secure the housing bracket to the rail.

FIG. 7 depicts components of the housing 140 of the motorized roller shade 100, including the first attachment member 162 and the rail 142. For the sake of clarity, only a portion of the rail proximate to the first end 141 is shown. FIG. 7 further depicts another example mounting bracket lock 300 that is attachable to the motorized roller shade 100, and that may operate to secure the first attachment member 162 to the first end 141 of the rail 142. In this regard, the mounting bracket lock 300 may be a component of the motorized roller shade 100.

Referring additionally to FIGS. 8A-8E, the example mounting bracket lock 300 includes a body 302 that is mountable to the rail 142 of the motorized roller shade 100. As shown, the body 302 defines a front wall 304 that is elongate from a first end 306 to an opposed second end 308, and that extends along the longitudinal direction L.

The mounting bracket lock 300 may be configured to be operatively coupled to the rail 142. For example, when the mounting bracket lock 300 is attached to the rail 142, the mounting bracket lock 300 may be slidable along the rail 142 (e.g., along the longitudinal direction L). As shown, the body 302 of the mounting bracket lock 300 may define a cavity 310 that extends into the second end 308 and through a first portion 312 of the body 302, along the longitudinal direction L. The cavity 310 may be sized to be disposed onto the free end 148 of the upper wall 146 of the rail 142, such that the mounting bracket lock 300 is slidable along the rail 142, for example toward or away from the first housing bracket 160. In this regard, the first portion 312 of the body 302 of the mounting bracket lock 300 may be configured to slidably attach to the rail 142.

In accordance with the illustrated example of the mounting bracket lock 300, the body 302 may further define a retention tab 314 that is configured to slidably engage with the rail 142, and that may operate to retain the mounting bracket lock 300 in a slidable configuration relative to the rail 142. As shown, the first portion 312 of the body 302 may define a rear wall 316 that extends rearward from the front wall 304 to a free end 318, along the lateral direction A. As shown, the retention tab 314 may be defined at the free end 318 of the rear wall 316. The illustrated retention tab 314 is spaced rearward along the lateral direction A and upward along the transverse direction T from the free end 318 of the rear wall 316. As shown, the retention tab 314 may define an abutment surface 320 that may be parallel to the rear wall 316.

The mounting bracket lock 300 may be configured to be retained in slidable attachment along the rail 142. For example, as shown, the body 302 of the mounting bracket lock 300 may define a resilient retaining strap 311 that extends from the free end 318 of the rear wall 316. The retaining strap 311 may define a fixed end 313 that is located proximate the free end 318 of the rear wall 316, and a free end 315 that is spaced from the fixed end 313. As shown, the retaining strap 311 may be angularly offset relative to the rear wall 316, such that the retaining strap 311 slopes upward along the transverse direction T and forward along the lateral direction A from the fixed end 313. The body 302 may define an opening 317 that is configured to receive at least a portion of the retaining strap 311 when the free end 315 of the retaining strap 311 is deflected toward the rear wall 316. As shown, the opening 317 may extend through the rear wall 316 and may be sized slightly larger than the retaining strap 311, such that when the retaining strap 311 is pivotally deflected about the fixed end 313, the retaining strap 311 may be received in the opening 317.

When the mounting bracket lock 300 is attached to the rail 142, the cavity 310 may be disposed over the free end 148 of the rail 142. As the cavity 310 is disposed over the free end 148 of the rail 142, the free end 315 of the retaining strap 311 may abut the free end 148, such that the retaining strap deflects towards and at least partially into the opening 317. As the mounting bracket lock 300 moves into a slidably attached position on the free end 148 of the rail 142, the free end 315 of the retaining strap 311 may snap into place behind the ridge 149 of the upper wall 146. The cavity 310 and the retaining strap 311 may cooperate to retain the mounting bracket lock 300 in a slidably attached position on the rail 142. For example, the free end 315 of the retaining strap 311 may slidably engage with the free end 148 of the rail 142, for example as the mounting bracket lock 300 is moved along the rail 142, to retain the mounting bracket lock 300 in a slidable configuration relative to the rail 142. The free end 148 of the rail 142 (e.g., including the ridge 149) may be referred to as a first section of the rail 142, for example relative to the mounting bracket lock 300. In this regard, the cavity 310 is mountable over the first section of the rail 142, and the retaining strap 311 may be configured to slidably engage with the first section of the rail 142 to retain the mounting bracket lock 300 in a slidable configuration relative to the rail 142.

Figure 10:
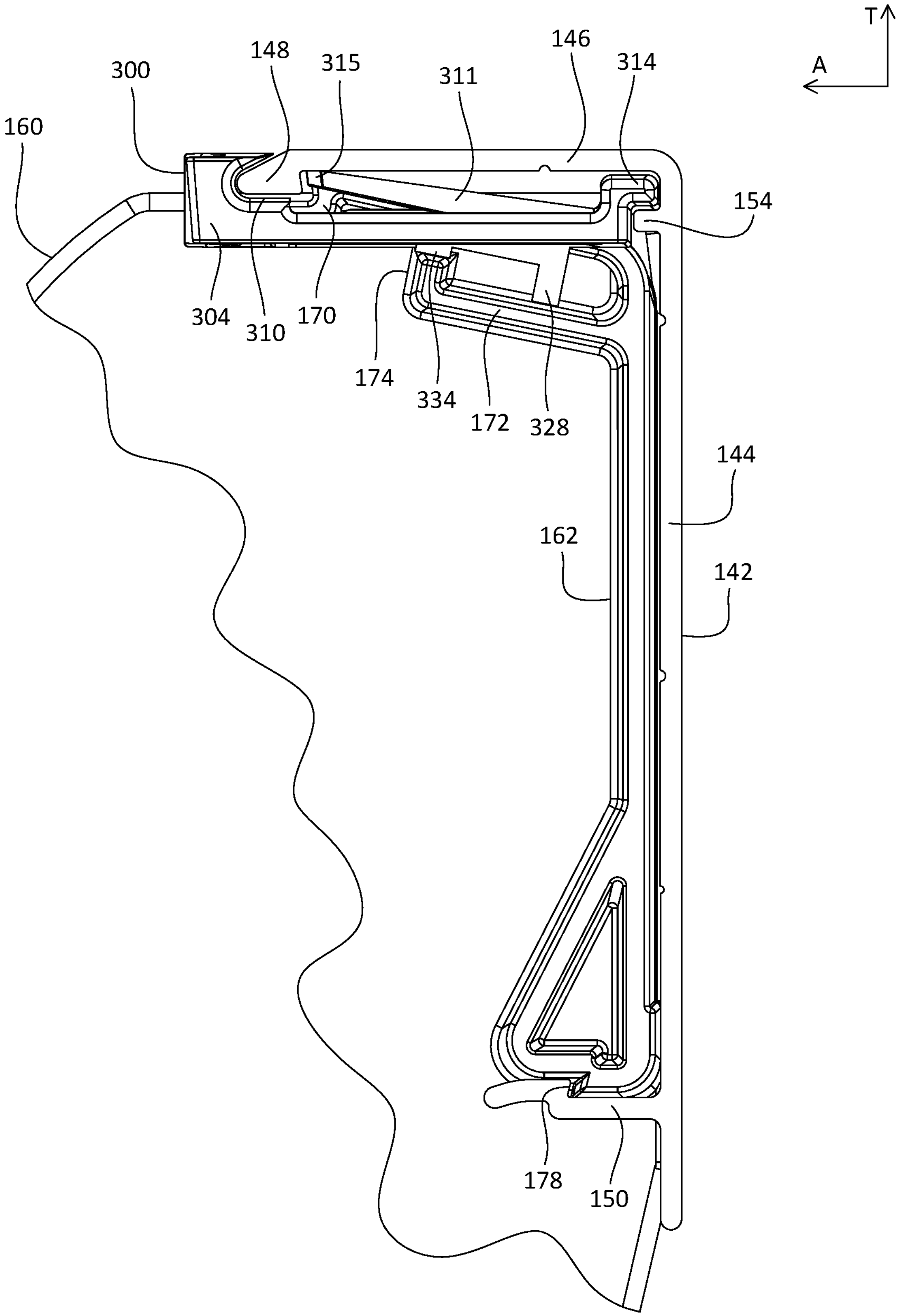
FIG. 10 is a zoomed-in side elevation view of a portion of the assembly illustrated in FIGS. 9A and 9B.

In accordance with an example process of slidably attaching the mounting bracket lock 300 to the rail 142, the abutment surface 320 of the retention tab 314 may be placed onto an upper surface of the ledge 154 of the rear wall 144. The mounting bracket lock 300 may then be pivoted upward toward the upper wall 146, such that the cavity 310 of the first portion 312 of the body 302 is disposed onto the free end 148 of the upper wall 146. As the free end 315 of the retaining strap 311 moves past the ridge 149 of the upper wall 146, the free end 315 may snap into place behind the ridge 149, at which point the retaining strap 311 may resiliently return to a rest state (e.g., as shown in FIG. 10). During operation of the mounting bracket lock 300, the abutment surface 320 of the retention tab 314 may slide along the ledge 154. The ledge 154 may be referred to as a second section of the rail 142. In this regard, the abutment surface 320, and more generally the retention tab 314, may slide along the second section of the rail 142.

The example mounting bracket lock 300 may be configured to releasably engage with a portion of the attachment member 162 of the first housing bracket 160, in order to prevent the first housing bracket 160 from detaching from the rail 142. For example, as shown, the body 302 of the mounting bracket lock 300 may define an opening 324 that extends into the first end 306 and through a second portion 326 of the body 302, toward the first portion 312, along the longitudinal direction L.

Figure 11:
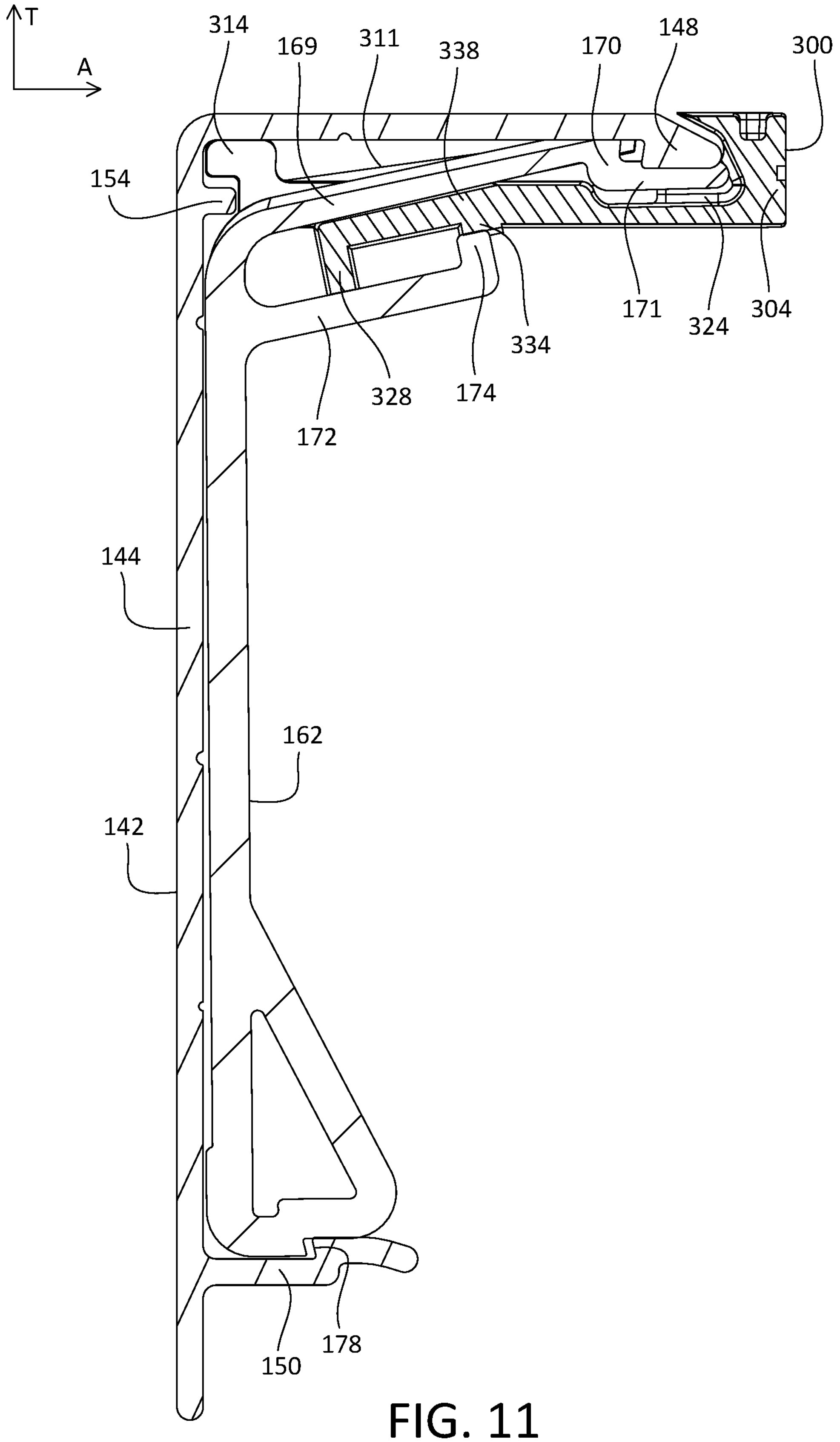
FIG. 11 is a section view of the assembly illustrated in FIG. 10, projected along a direction extending out of the page.

The opening 324 may be open to the cavity 310 and may be configured to receive a corresponding portion of the free end 148 of the rail 142, and to further receive a portion of the attachment member 162 of the first housing bracket 160 when the mounting bracket lock 300 is in a locked position relative to the first housing bracket 160 (e.g., as shown in FIG. 11). For example, as shown, the opening 324 may be configured to receive a portion of the second section 171 of the upper wall 168 of the attachment member 162. In this regard, the opening 324 of the second portion 326 of the body 302 may define a cross section that is larger than a cross section of the cavity 310 of the first portion 312. The second portion 326 of the body 302 may define a length L3 along the longitudinal direction L that is substantially equal to the length L2 of the upper wall 168 of the attachment member 162 along the longitudinal direction L.

The body 302 of the mounting bracket lock 300 may be configured to engage with the attachment member 162 of the first housing bracket 160 when the mounting bracket lock 300 is operated to the locked position. For example, the body 302 may define one or more projections that extend from the body 302 and that may be configured to engage with corresponding portions of the attachment member 162 of the first housing bracket 160 when the mounting bracket lock 300 is operated to the locked position.

Figure 8A:
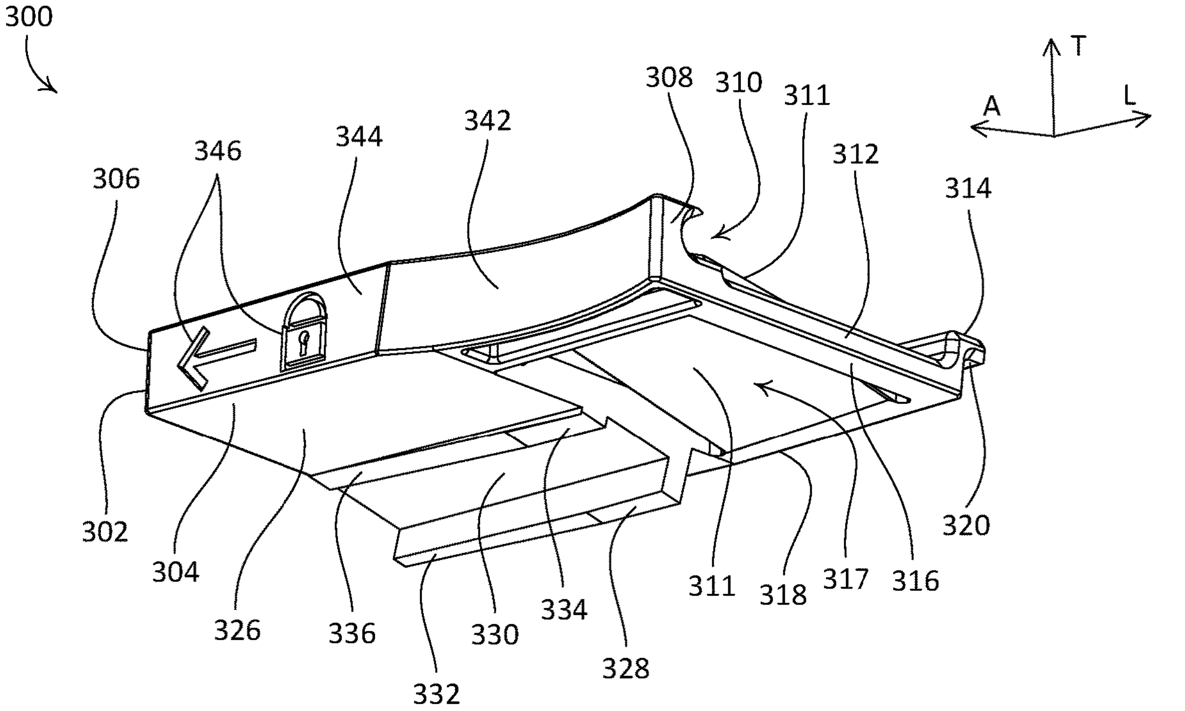
FIG. 8A is a perspective view of the example mounting bracket lock depicted in FIG. 7.
Figure 8B:
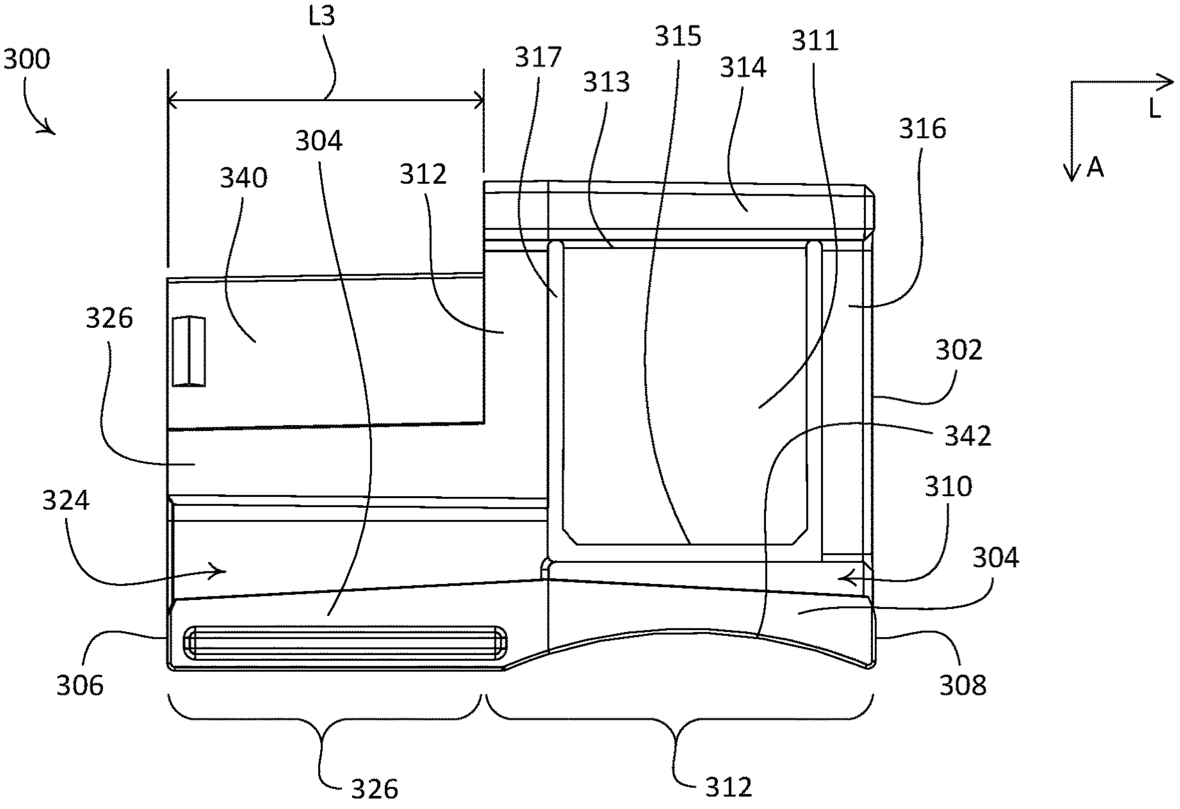
FIG. 8B is a top view of the example mounting bracket lock depicted in FIG. 7.
Figure 8C:
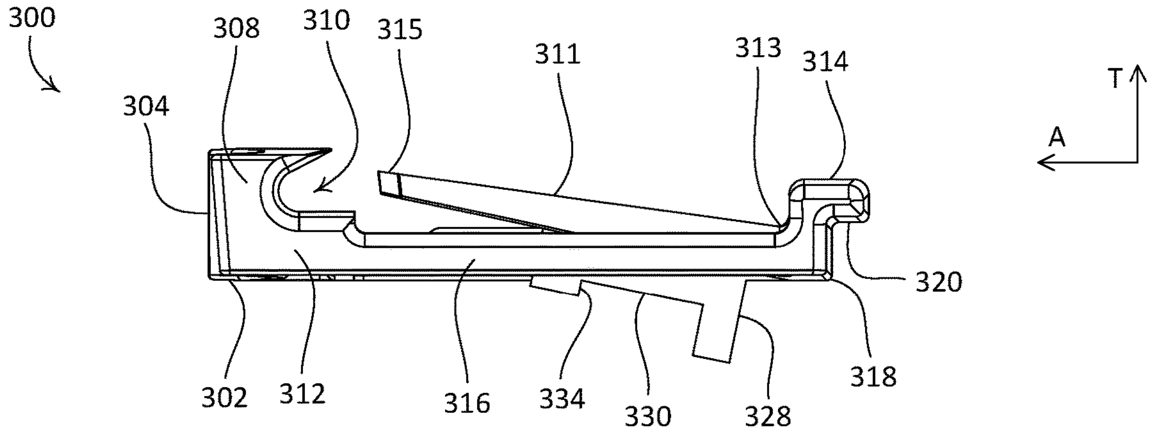
FIG. 8C is a right elevation view of the example mounting bracket lock depicted in FIG. 7.
Figure 8D:
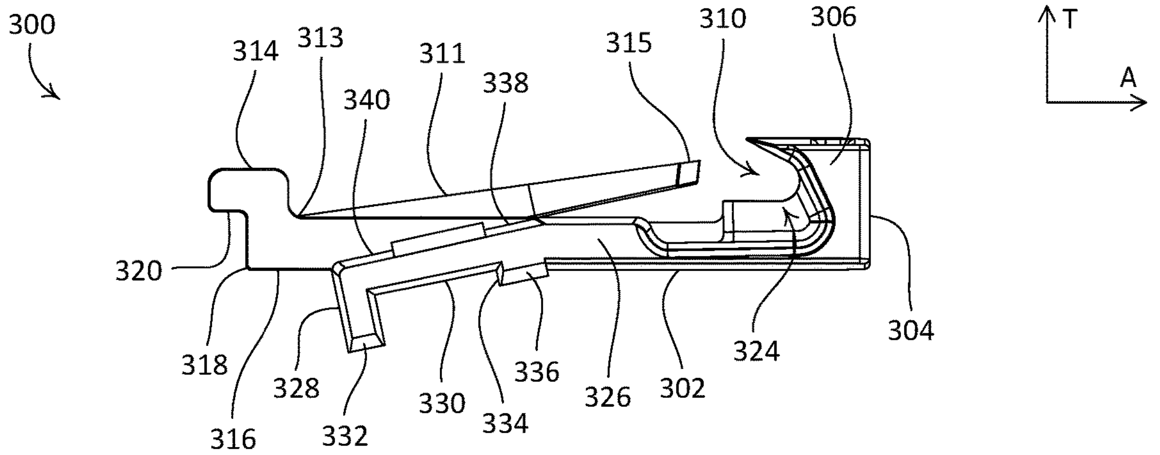
FIG. 8D is a left elevation view of the example mounting bracket lock depicted in FIG. 7.
Figure 8E:
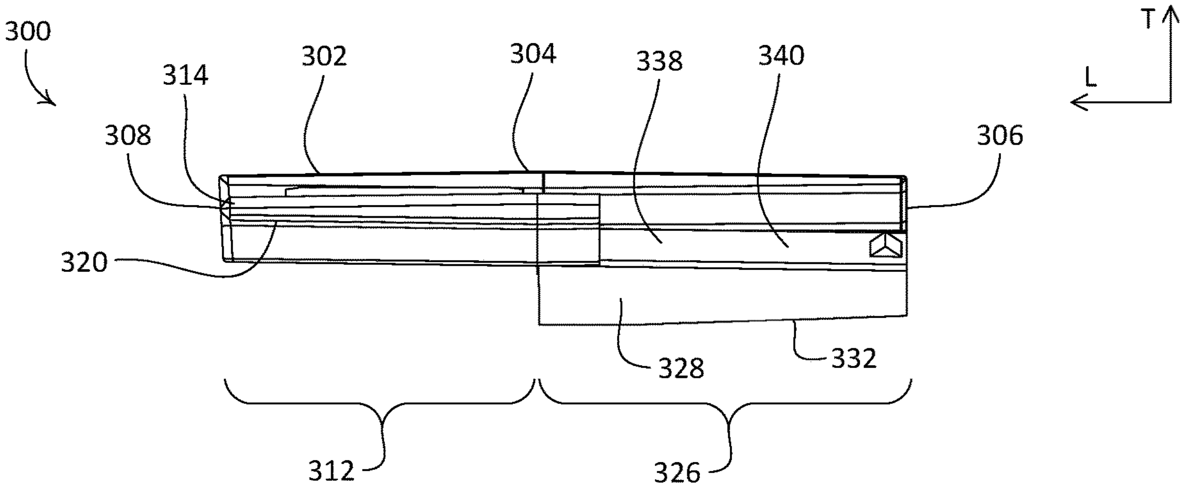
FIG. 8E is a rear elevation view of the example mounting bracket lock depicted in FIG. 7.

As shown, the second portion 326 of the body 302 may define a projection 328 that extends downward from a lower surface 330 of the second portion 326 of the body 302. The projection 328 may be referred to as a first projection 328. The first projection 328 may be elongate along the longitudinal direction L, along the length L1 of the second portion 326, and may define a lower surface 332 that is sloped upward relative to the longitudinal direction L with increasing distance from the first portion 312 toward the first end 306 of the body 302 (e.g., as shown in FIGS. 8A and 8E). As shown, the lower surface 332 may additionally be sloped along a direction that declines, relative to the lateral direction A, with increasing distance from the front wall 304 (e.g., as shown in FIGS. 8C and 8D), and that may extend parallel to the inner surface 179 of the intermediate wall 172 of the attachment member 162.

The second portion 326 of the body 302 may define a projection 334 that extends downward from the lower surface 330 of the second portion 326 of the body 302. The projection 334 may be referred to as a second projection 334. The second projection 334 may be elongate along the longitudinal direction L, along the length L1 of the second portion 326, and may define a lower surface 336 that is sloped upward relative to the longitudinal direction L with increasing distance from the first portion 312 toward the first end 306 of the body 302 (e.g., as shown in FIG. 8A). As shown, the lower surface 336 may additionally be sloped along a direction that declines relative to the lateral direction A with increasing distance from the front wall 304 (e.g., as shown in FIGS. 8C and 8D), and that may extend parallel to the upper surface 175 of the lip 174 of the intermediate wall 172 of the attachment member 162. In accordance with the illustrated mounting bracket lock 300, the second projection 334 may extend downward from the lower surface 330 of the second portion 326 through a distance that is shorter than that through which the first projection 328 extends downward from the lower surface 330.

The second portion 326 of the body 302 may define a projection 338 that extends upward relative to the lower surface 330 of the second portion 326 of the body 302. The projection 338 may be referred to as a third projection 338. The third projection 338 may be elongate along the longitudinal direction L, along the length L1 of the second portion 326, and may define an upper surface 340 that is sloped downward relative to the longitudinal direction L with increasing distance from the first portion 312 toward the first end 306 of the body 302 (e.g., as shown in FIG. 8E). As shown, the upper surface 340 may additionally be sloped along a direction that declines relative to the lateral direction A with increasing distance from the front wall 304 (e.g., as shown in FIG. 8D), and that may extend parallel to the inner surface 177 of the first section 169 of the upper wall 168 of the attachment member 162.

As shown in FIG. 8E, in accordance with the sloped lower surface 332 of the first projection 328 and the sloped upper surface 340 of the third projection 338, the second portion 326 of the body 302 may taper with increasing distance from the first portion 312 toward the first end 306 of the body 302, such that the second portion 326 of the body 302 may define a wedge shaped profile. In this regard, the first projection 328 and the third projection 338 may together define a wedge shape that may be configured to generate a friction fit when disposed into a corresponding portion of the attachment member 162 of the first housing bracket 160, for instance within the cavity 176.

The mounting bracket lock 300 may be configured to assist a user thereof, for example in accordance with assembly of a window treatment that includes the mounting bracket block 300 (e.g., the motorized roller shade 100), and/or in accordance with subsequent maintenance of such a window treatment. For example, as shown, the first portion 312 of the body defines an arc shaped groove 342 that extends into a front surface 344 of the front wall 304. The groove 342 may be configured to receive a finger or thumb, for example, of a user of the mounting bracket lock 300, and may apply a surface upon which force may be applied by the user to cause the mounting bracket lock 300 to slide along the rail 142. In this regard, the mounting bracket lock 300 may be operated between the locked and unlocked positions without the use of tools.

The mounting bracket lock 300 may include one or more indicia 346 that are related to operation thereof. For example, as shown, the second portion 326 of the body 302 defines indicia 346 in the form of a directional arrow and an image of a lock that are recessed into the front surface 344 of the front wall 304, and that indicate that the mounting bracket lock 300 may be slid along the rail 142 toward the first end 141 of the rail 142 to operate the mounting bracket lock 300 into a locked position relative to the first housing bracket 160. In this regard, the mounting bracket lock 300 may be self-teaching with regard to its operation, for instance such that prior instruction may not be needed to understand operation of the mounting bracket lock 300.

Figure 9A:
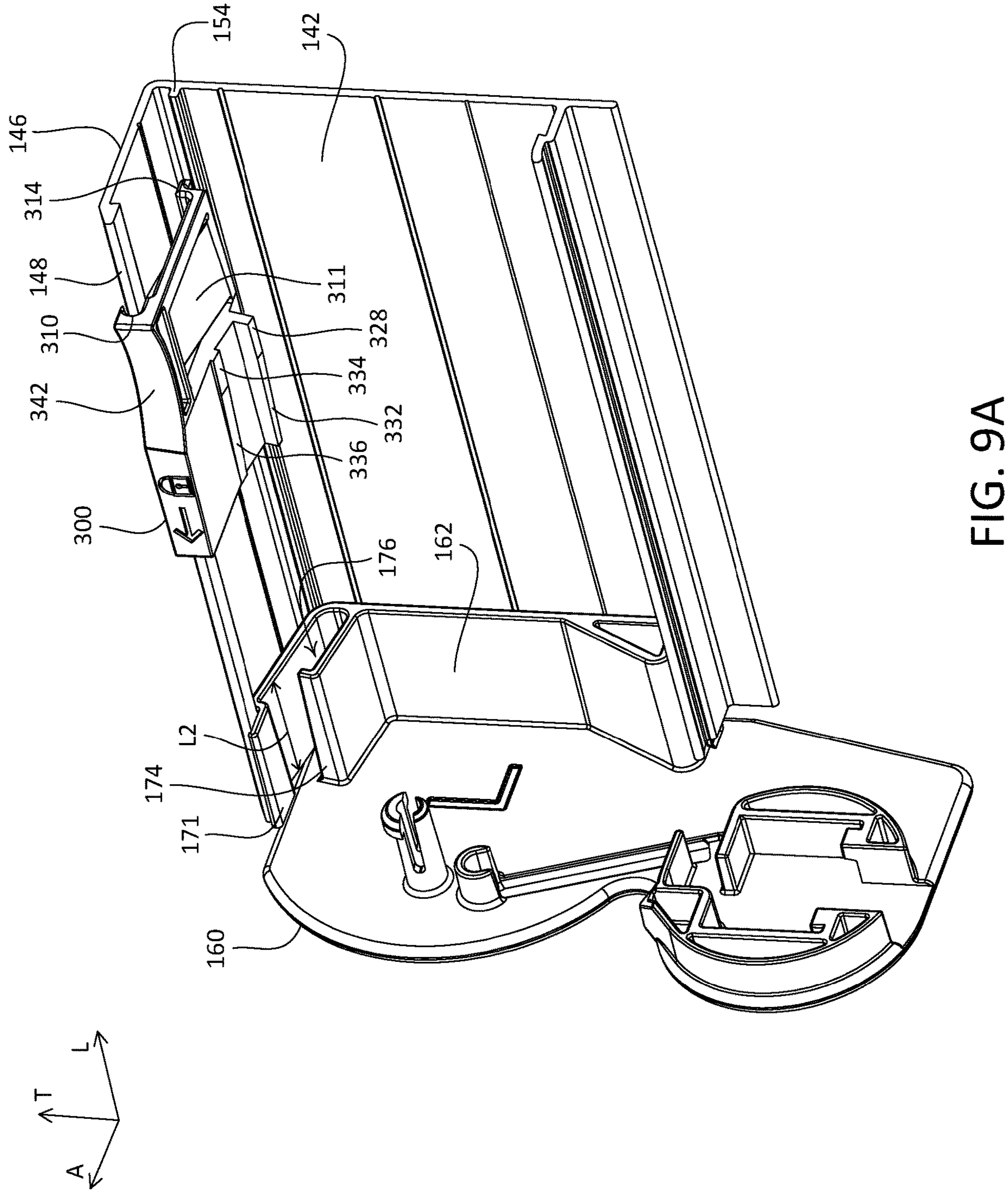
FIG. 9A is a perspective view of an assembly of the components illustrated in FIG. 7, with the housing bracket attached to the rail and the example mounting bracket lock in an unlocked position.
Figure 9B:
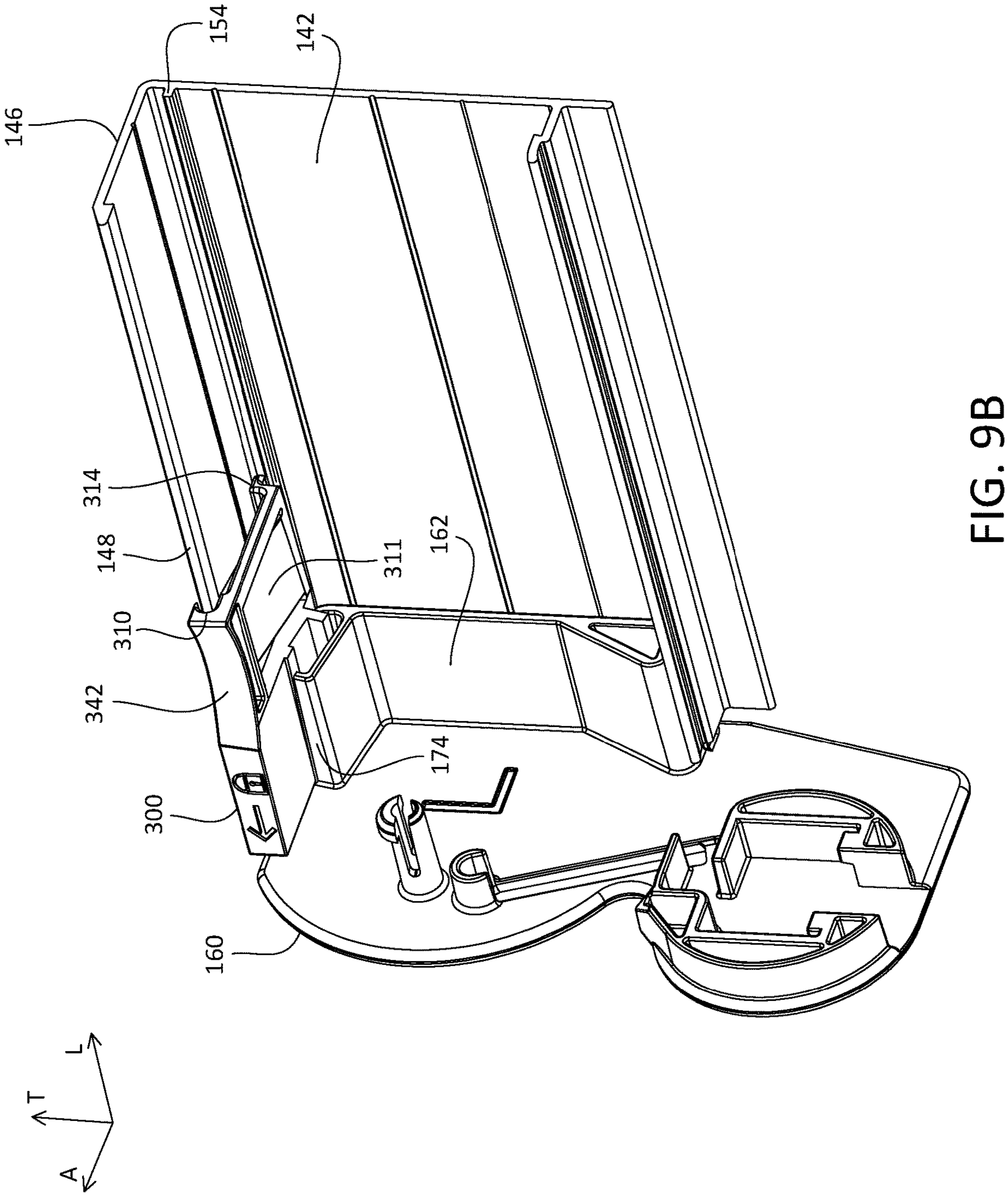
FIG. 9B is a perspective view of the assembly illustrated in FIG. 9A, with the example mounting bracket lock in a locked position.

FIGS. 9A and 9B depict an example of operation of the mounting bracket lock 300 from an unlocked position to a locked position. FIG. 9A depicts a partial assembly of components of the housing 140 of the motorized roller shade 100, in which the attachment member 162 of the first housing bracket 160 is attached to the first end 141 of the rail 142, for example as described herein. The mounting bracket lock 300 is slidably attached to the rail 142, and is in an unlocked position in which the mounting bracket lock 300 is spaced from the attachment member 162. With the mounting bracket lock 300 in the unlocked position, the first housing bracket 160 may be detached from the rail 142. The mounting bracket lock 300 may be operated to a locked position by causing the mounting bracket lock 300 to slide toward the first end 141 of the rail 142, for example by applying pressure to the groove 342. As the mounting bracket lock 300 moves into the locked position, the opening 324 may receive the second section 171 of the upper wall 168 of the attachment member 162, thereby securing the first housing bracket 160 in position relative to the rail 142, such that the first housing bracket 160 is prevented from becoming detached from the rail 142. In this regard, the mounting bracket lock 300 may be secured in place in the locked position without the use of external fasteners (e.g., screws). The mounting bracket lock 200 may be configured such that if the attachment member 162 (e.g., the second section 171 of the upper wall 168) is not in a fully attached position relative to the rail 142, the mounting bracket lock 200 will not slide into the locked position, for example via the dimensions and/or tolerances with which the opening 224 is configured.

Additionally, as the mounting bracket lock 300 moves into the locked position the second portion 326 of the body 302 may be received in the cavity 176 of the attachment member 162. The second portion 326 may generate a friction fit within the cavity 176, which may secure the mounting bracket lock 300 in position relative to the first housing bracket 160. More specifically, the lower surface 332 of the first projection 328 may abut (e.g., engage with) the inner surface 179 of the intermediate wall 172 of the attachment member 162, and the upper surface 340 of the third projection 338 may abut (e.g., engage with) the inner surface 177 of the first section 169 of the upper wall 168 of the attachment member 162. The wedge shape of the second portion 326 may cause the lower surface 332 of the first projection 328 and the upper surface 340 of the third projection 338 to apply friction forces against inner surfaces 179, 177, respectively, of the cavity 176.

Furthermore, as the mounting bracket lock 300 moves into the locked position, the lower surface 336 of the second projection 334 may abut (e.g., engage with) the upper surface 175 of the lip 174 of the attachment member 162. Friction force applied by the lower surface 336 of the second projection 334 against the upper surface 175 of the lip 174 may contribute to securement of the first housing bracket 160 in position relative to the rail 142.

In an example operation of removing the first housing bracket 160 from the rail 142, the mounting bracket lock 300 may be operated to an unlocked position (e.g., as shown in FIG. 8A) by causing the mounting bracket lock 300 to slide away from the first end 141 of the rail 142, for instance by applying pressure to the groove 342. With the mounting bracket lock 300 in an unlocked position, the first housing bracket 160 may be detached from the rail 142. For example, downward pressure may be applied to the second section 171 of upper wall 168 of the attachment member 162, thereby causing the jog 170 to slip past the ridge 149 of the upper wall 146 of the rail 142. The upper end 165 of the attachment member 162 may then be pivoted downward and away from the upper end 145 of the rear wall 144. As the attachment member 162 pivots forward from the rear wall 144, the edge 178 may become unseated from the ridge 152 of the lower wall 150 of the rail 142, such that the first housing bracket 160 may then be removed from the rail 142.

It should be appreciated that the mounting bracket lock 300 is not limited to the example configuration illustrated and described herein. For example, the mounting bracket lock 300 may be alternatively provided in a configuration that is mirrored relative to the illustrated mounting bracket lock 300 (e.g., reflected in a plane defined by the transverse direction T and the lateral direction A). Such an alternate configuration of the mounting bracket lock 300 may be used, for example, to secure the second housing bracket 180 to the second end 143 of the rail 142. Moreover, the mounting bracket lock 300 may be alternatively configured with more, fewer, or different projections that extend from the first and/or second portions 312, 326 of the body 302. In accordance with such alternate configurations, the projections 328, 334, and 338 may be referred to as other than the first, second, and third projections, respectively.

It should further be appreciated one or more mounting bracket locks 300 may be provided with other components of the housing of a window treatment, such as the first and second housing brackets 160, 180, and the rail 142. In this regard, the mounting bracket lock 300 may be a component of a window treatment housing (e.g., the housing 140), and more generally may be a component of a window treatment (e.g., the motorized roller shade 100). It should further still be appreciated that one or more mounting bracket locks 300 may be provided with a window treatment kit, or may be provided separately, for example in accordance with a retrofit installation of the mounting bracket locks 300. It should further still be appreciated that the example mounting bracket lock 300 is not limited to use with the housing of a roller shade window treatment, such as the motorized roller shade 100. For example, the mounting bracket lock 300 may be adapted for use with the respective housings of other types of window treatments, such as roman shades, venetian blinds, draperies, and so on.

The invention claimed is:

1. An apparatus for mounting a window treatment, the apparatus comprising:
- an elongated rail configured to be mounted to a structure;
- a mounting bracket configured to attach to the rail via an attachment member;
- a mounting bracket lock that is configured to be slidably attached to the rail for sliding between a locked position and an unlocked position, the mounting bracket lock defining a first projection that extends from the mounting bracket lock and is configured to engage a first surface of the attachment member of the mounting bracket when the mounting bracket lock is in the locked position;
- wherein the mounting bracket lock is configured to prevent the mounting bracket from detaching from the rail when in the locked position, and allow the mounting bracket to detach from the rail while the rail is mounted to the structure when in the unlocked position.

2. The apparatus of claim 1, wherein the first projection of the mounting bracket lock is configured to engage with the first surface of the attachment member of the mounting bracket via a friction fit to secure the mounting bracket lock in the locked position.

3. The apparatus of claim 1, wherein the attachment member of the mounting bracket is configured to disengage with the first end of the rail in response to a pressure applied to a section of the attachment member of the mounting bracket.

4. The apparatus of claim 1, wherein the mounting bracket lock comprises a body having a first portion that is configured to slidably attach to the rail and a second portion that is configured to receive a portion of the mounting bracket to secure the mounting bracket to the rail when the mounting bracket lock is in the locked position.

5. The apparatus of claim 4, wherein the body of the mounting bracket lock includes the first projection, the first projection extending from the second portion of the body.

6. The apparatus of claim 5, wherein the body of the mounting bracket lock includes a second projection that extends from the second portion of the body, the second projection configured to engage with a lip of the attachment member to assist with securing the mounting bracket to the rail when the mounting bracket lock in the locked position.

7. The apparatus of claim 6, wherein the body of the mounting bracket lock includes a third projection that extends from the second portion of the body and is configured to engage a second surface of the mounting bracket, the first and third projections extending from the second portion of the body in respective first and second directions, wherein the first direction different is from the second direction.

8. The apparatus of claim 5, wherein the body of the mounting bracket lock includes a second projection that extends from the second portion, the second projection configured to engage with a second surface of the mounting bracket.

9. The apparatus of claim 8, wherein the first and second projections extend from the second portion of the body in respective first and second directions, the first direction different from the second direction.

10. The apparatus of claim 9, wherein the first and second projections are configured to be received between the first and second surfaces so as to generate a friction fit therebetween.

11. The apparatus of claim 9, wherein the first and second surfaces correspond to a cavity defined by the mounting bracket, and the first and second projections define a wedge that is configured to generate a friction fit within the cavity.

12. The apparatus of claim 5, wherein the first portion of the body defines a cavity that is mountable over a first section of the rail.

13. The apparatus of claim 12, wherein the second portion defines an opening that extends into the body toward the first section of the rail and is open to the cavity of the first portion of the body.

14. The apparatus of claim 13, wherein the opening is configured to receive both the portion of the mounting bracket and a portion of the first section of the rail.

15. The apparatus of claim 12, wherein the first portion of the body includes an abutment surface that is configured to slide along a second section of the rail.

16. The apparatus of claim 15, wherein the first portion of the body includes a resilient retention strap, the retention strap having a beveled end that defines the abutment surface.

17. The apparatus of claim 16, wherein the beveled end of the retention strap is configured to slidably engage the second section of the rail to retain the mounting bracket lock in a slidable configuration relative to the rail.

18. The apparatus of claim 15, wherein the first portion of the body includes a rear wall, the rear wall having a retention tab that includes the abutment surface.

19. The apparatus of claim 18, wherein the first portion of the body includes a resilient retaining strap that is configured to slidably engage with the first section of the rail to retain the mounting bracket lock in a slidable configuration relative to the rail.

20. The apparatus of claim 15, wherein the first section of the rail is a ridge that extends along the rail, and wherein the second section of the rail is a ledge that extends along the rail.

* * * * *